United States Patent
Yano

(10) Patent No.: US 10,503,889 B2
(45) Date of Patent: Dec. 10, 2019

(54) MOBILE TERMINAL, MOBILE TERMINAL PROGRAM, CHECKPOINT MANAGEMENT SYSTEM, AND CHECKPOINT MANAGEMENT METHOD

(71) Applicant: The Aqua Enterprise Company, Kisarazu-shi, Chiba (JP)

(72) Inventor: Koichi Yano, Kisarazu (JP)

(73) Assignee: The Aqua Enterprise Company, Chiba (JP)

( * ) Notice: Subject to any disclaimer, the term of this patent is extended or adjusted under 35 U.S.C. 154(b) by 0 days.

(21) Appl. No.: 15/521,516

(22) PCT Filed: Oct. 20, 2015

(86) PCT No.: PCT/JP2015/079590
§ 371 (c)(1),
(2) Date: Apr. 24, 2017

(87) PCT Pub. No.: WO2016/063878
PCT Pub. Date: Apr. 28, 2016

(65) Prior Publication Data
US 2017/0308692 A1    Oct. 26, 2017

(30) Foreign Application Priority Data

Oct. 24, 2014 (JP) ................................ 2014-217002

(51) Int. Cl.
*G06F 21/35* (2013.01)
*H04W 4/029* (2018.01)
(Continued)

(52) U.S. Cl.
CPC .............. *G06F 21/35* (2013.01); *G06F 21/34* (2013.01); *G06F 21/44* (2013.01); *G06K 7/10* (2013.01);
(Continued)

(58) Field of Classification Search
CPC .......... G06F 21/35; G06F 21/44; H04W 4/02; H04W 4/021; H04W 4/025; H04W 4/80;
(Continued)

(56) References Cited

U.S. PATENT DOCUMENTS

2006/0022802 A1  2/2006  Bridgelall
2009/0248437 A1  10/2009  Gucciardi et al.
(Continued)

FOREIGN PATENT DOCUMENTS

CA    2835508 A1    11/2012
CA    2802340 A1    7/2013
(Continued)

OTHER PUBLICATIONS

International Search Report, dated Jan. 19, 2016, Cited in PCT/JP2015/079590, 2 Pages.

*Primary Examiner* — Margaret G Mastrodonato
(74) *Attorney, Agent, or Firm* — Patshegen IP LLC; Moshe Pinchas

(57) ABSTRACT

A mobile terminal that can be utilized for a checkpoint management system performs contactless electric communication with a reader/writer device for a passive RFID tag. An application processing unit cooperates with an application server through electronic communication. A position information acquisition unit acquires current position information of the mobile terminal. A terminal controller or a RFID tag processing unit receives a signal related to a carrier wave or a command emitted from the reader/writer device which results in a trigger that causes the application processing unit to operate. The application processing unit acquires from the mobile terminal personal information and chronologic information. The application processing unit further transmits the information to the application server together with current position information. Information transmitted from the mobile terminal can be utilized as (Continued)

history information on the checkpoint from, through or at which the user departs, passes or arrives.

30 Claims, 15 Drawing Sheets

(51) Int. Cl.

| | | |
|---|---|---|
| G06F 21/44 | (2013.01) | |
| G07G 1/14 | (2006.01) | |
| G06K 19/07 | (2006.01) | |
| H04W 4/02 | (2018.01) | |
| G06Q 50/10 | (2012.01) | |
| H04W 84/10 | (2009.01) | |
| G07G 1/12 | (2006.01) | |
| G06K 7/10 | (2006.01) | |
| G06F 21/34 | (2013.01) | |
| G07B 15/00 | (2011.01) | |
| H04W 8/18 | (2009.01) | |
| H04W 4/021 | (2018.01) | |
| H04W 4/80 | (2018.01) | |

(52) U.S. Cl.
CPC ......... *G06K 19/07* (2013.01); *G06K 19/0719* (2013.01); *G06Q 50/10* (2013.01); *G07B 15/00* (2013.01); *G07G 1/12* (2013.01); *G07G 1/14* (2013.01); *H04W 4/021* (2013.01); *H04W 4/025* (2013.01); *H04W 4/029* (2018.02); *H04W 4/80* (2018.02); *H04W 8/18* (2013.01); *H04W 84/10* (2013.01); *H04W 4/023* (2013.01)

(58) Field of Classification Search
CPC ............ H04W 40/244; G06Q 30/0255; G06Q 30/0261
See application file for complete search history.

(56) References Cited

U.S. PATENT DOCUMENTS

| | | | |
|---|---|---|---|
| 2011/0246070 A1 | 6/2011 | Fitzpatrick | |
| 2012/0088487 A1 | 4/2012 | Khan | |
| 2012/0203620 A1* | 8/2012 | Dobyns | G06Q 30/0234 |
| | | | 705/14.38 |
| 2012/0209745 A1* | 8/2012 | Spencer, II | G06Q 20/327 |
| | | | 705/26.41 |
| 2013/0293355 A1 | 11/2013 | Christopher | |
| 2014/0156396 A1* | 6/2014 | deKozan | G06Q 30/0255 |
| | | | 705/14.53 |
| 2015/0073980 A1* | 3/2015 | Griffin | H04W 4/21 |
| | | | 705/39 |
| 2015/0160328 A1* | 6/2015 | Peinhardt | G01S 5/0036 |
| | | | 455/456.3 |

FOREIGN PATENT DOCUMENTS

| | | |
|---|---|---|
| CN | 101546362 A | 9/2009 |
| DE | 102009003684 A1 | 10/2009 |
| EA | 13103 B1 | 2/2010 |
| JP | 2005-50263 A | 2/2005 |
| JP | 2009-080785 A | 4/2009 |
| JP | 2009-87055 A | 4/2009 |
| JP | 2009238225 A | 10/2009 |
| JP | 4839416 B1 | 12/2011 |
| JP | 5129414 B2 | 1/2013 |
| JP | 5174993 B2 | 4/2013 |
| KR | 10-2012-0059177 A | 6/2012 |
| RU | 2007110906 A | 10/2008 |
| RU | 2406265 C2 | 12/2010 |
| RU | 2419832 C2 | 5/2011 |
| RU | 2423734 C2 | 7/2011 |
| RU | 2012100245 A | 8/2013 |
| RU | 2515547 C2 | 5/2014 |
| RU | 2533445 C2 | 11/2014 |
| WO | 2014/001640 A2 | 1/2014 |

* cited by examiner

FIG. 2
(a)
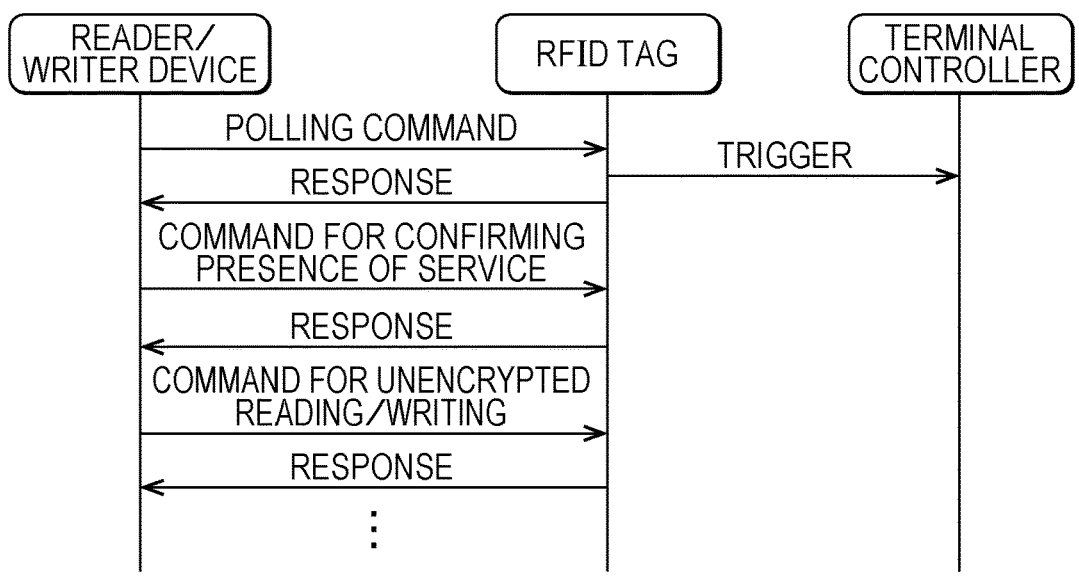
(b)
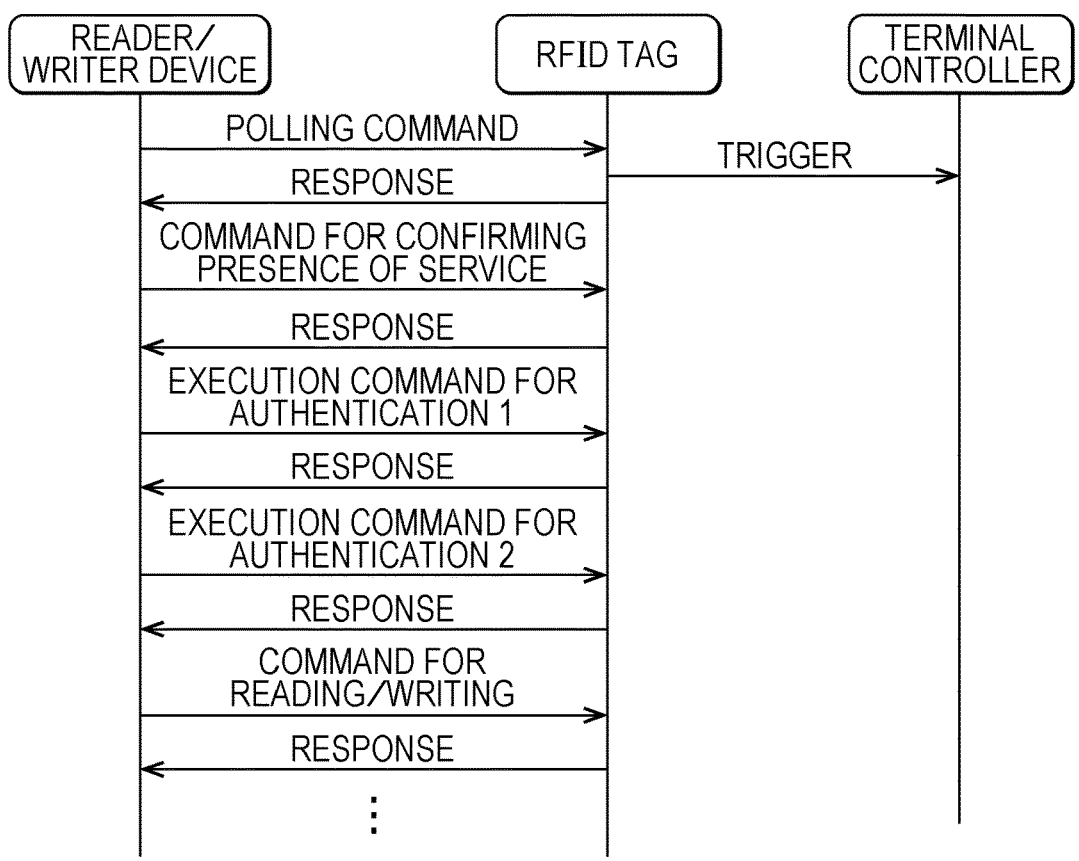

FIG. 5
(a)
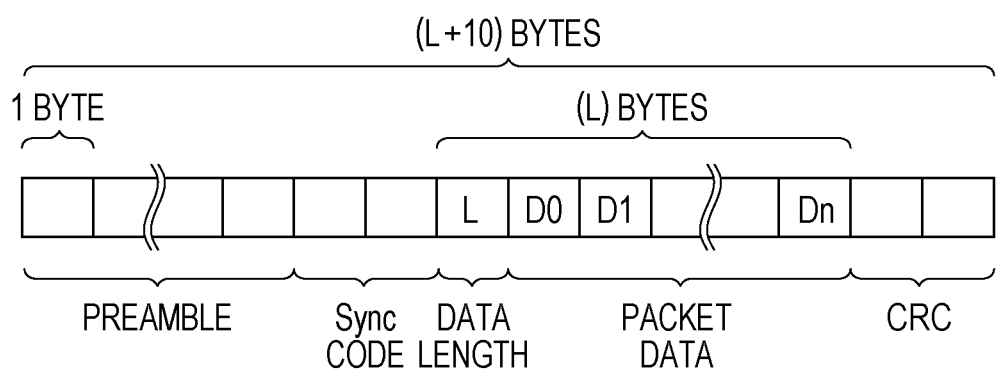
(b)
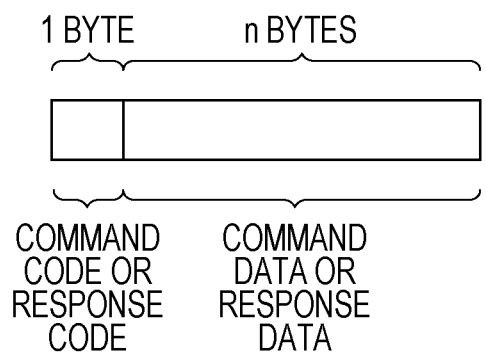

FIG. 6

TRAVEL REPORT

CHECKPOINT DETECTION DATE AND TIME: YYYY/MM/DD HH:MM

PLEASE SELECT A CHECKPOINT TO BE REPORTED

| | | | |
|---|---|---|---|
| REGION OF WORLD: | ▼ | COUNTRY: | ▼ |
| PROVINCE OR STATE: | ▼ | PREFECTURE OR COUNTY: | ▼ |
| CITY/WARD/TOWN/VILLAGE: | ▼ | FACILITY NAME: | ▼ |
| REGISTERED CHECKPOINT NAME: | ▼ | FLOOR: | ▼ |
| LOCATION: | [map image] | PHOTOGRAPH(S): | Photo1 Photo2 Photo3 Photo4 |

IF NO APPROPRIATE CHECKPOINT IS FOUND, PLEASE REGISTER A NEW CHECKPOINT

| | | | |
|---|---|---|---|
| REGION OF WORLD: | ▼ | COUNTRY: | ▼ |
| PROVINCE OR STATE: | ▼ | PREFECTURE OR COUNTY: | ▼ |
| CITY/WARD/TOWN/VILLAGE: | ▼ | FACILITY NAME: | ▼ |
| NEW CHECKPOINT NAME: | | FLOOR: | ▼ |
| LOCATION: | [map image] | PHOTOGRAPH(S): | |
| LATITUDE, LONGITUDE (XXXX,YYYY) | | | |
| [RESET] | | | |

WILL YOU USE TRANSPORTATION?

☑ END POINT?

| | | | |
|---|---|---|---|
| TYPE OF TRANSPORTATION: | ▼ | | |
| DEPARTURE POINT: | ▼ | SCHEDULED DEPARTURE TIME: | ▼ |
| ARRIVAL POINT: | ▼ | SCHEDULED ARRIVAL TIME: | ▼ |
| OPERATING CARRIER: | ▼ | SERVICE/FLIGHT: | ▼ |
| DEPARTURE REGION OF WORLD: | ▼ | DEPARTURE COUNTRY: | ▼ |
| DEPARTURE PROVINCE OR STATE: | ▼ | DEPARTURE PREFECTURE OR COUNTY: | ▼ |
| DEPARTURE CITY/WARD/TOWN/VILLAGE: | ▼ | ⊕ ADD TRANSPORTATION | |

WHAT ARE WEATHER CONDITIONS AT THE CHECKPOINT?

| | | | |
|---|---|---|---|
| WEATHER: | ▼ | WIND: | ▼ |

HOW OFTEN HAVE YOU USED THIS ROUTE?

FREQUENCY OF USE: ▼

[TRANSMIT] [CANCEL]

FIG. 7

| No. | SETTING NAME | DAY OF WEEK TO APPLY | DELETION | CURRENT SETTING |
|---|---|---|---|---|
| | | TRAVEL PREDICTION SETTINGS | | |
| | PLEASE SELECT ANY FROM SAVED SETTINGS | | | |
| 1 | SETTING 001 | SUN, MON, TUE, WED, THU, FRI, SAT | × | |
| 2 | SETTING 002 | MON, TUE, WED, THU, FRI | × | O |
| 3 | SETTING 003 | SAT, SUN | × | |
| ... | ... | ... | ... | ... |

SET    CANCEL    ADD NEW SETTING

FIG. 8

```
TRAVEL PREDICTION SETTINGS (NEW ADDITION)
```

PLEASE SELECT THE START CHECKPOINT

| | |
|---|---|
| REGION OF WORLD: ▼ | COUNTRY: ▼ |
| PROVINCE OR STATE: ▼ | PREFECTURE OR COUNTY: ▼ |
| CITY/WARD/TOWN/VILLAGE: ▼ | FACILITY NAME: ▼ |
| REGISTERED CHECKPOINT NAME: ▼ | FLOOR: ▼ |
| LOCATION: 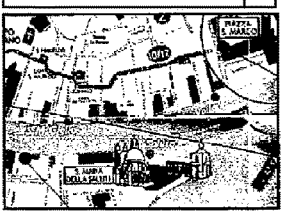 | PHOTOGRAPH(S): Photo1 / Photo2 / Photo3 |

PLEASE SET TRANSPORTATION

| | |
|---|---|
| TYPE OF TRANSPORTATION: ▼ | ☐ END POINT? |
| DEPARTURE POINT: ▼ | SCHEDULED DEPARTURE TIME: ▼ |
| ARRIVAL POINT: ▼ | SCHEDULED ARRIVAL TIME: ▼ |
| OPERATING CARRIER: ▼ | SERVICE/FLIGHT: ▼ |
| DEPARTURE REGION OF WORLD: ▼ | DEPARTURE COUNTRY: ▼ |
| DEPARTURE PROVINCE OR STATE: ▼ | DEPARTURE PREFECTURE OR COUNTY: ▼ |
| DEPARTURE CITY/WARD/TOWN/VILLAGE: ▼ | ⊕ ADD TRANSPORTATION |

⊕ ADD CONNECTING CHECKPOINT

PLEASE SELECT THE END CHECKPOINT

| | |
|---|---|
| REGION OF WORLD: ▼ | COUNTRY: ▼ |
| PROVINCE OR STATE: ▼ | PREFECTURE OR COUNTY: ▼ |
| CITY/WARD/TOWN/VILLAGE: ▼ | FACILITY NAME: ▼ |
| REGISTERED CHECKPOINT NAME: ▼ | FLOOR: ▼ |
| LOCATION:  | PHOTOGRAPH(S): Photo1  Photo6 / Photo2  Photo7 / Photo3  Photo8 / Photo4 / Photo5 |

⊕ SET DETAILED CONDITIONS FOR EXTRACTION
⊕ SET RENDEZVOUS INFORMATION

PLEASE SET SAVING CONDITIONS

SETTING NAME: _____   ALLOCATION NUMBER: (XX)

DAY OF WEEK TO APPLY: ☐ SUN ☑ MON ☑ TUE ☑ WED ☑ THU ☑ FRI ☐ SAT

[ SET ]   [ CANCEL ]

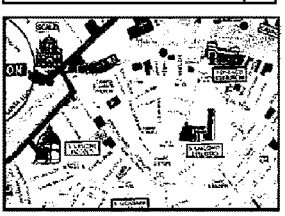

FIG. 13

| No. | ADVERTISER CATEGORY | CHECKPOINT | SPECIAL SALE TIME | SPECIAL PRICE | NORMAL PRICE |
|---|---|---|---|---|---|
| 1 | | | | | |
| 2 | | | | | |
| 3 | | | | | |
| ... | ... | ... | ... | ... | ... |

TRAVEL PREDICTION

TO: MR/MS. XXXXXX        THIS IS TRAVEL INFORMATION FOR ASSISTING MR/MS. XXXXXX'S SMART TRAVEL.

| NAME | DETAILS | SALES VOLUME | AD | ADVERTISER | MAP |
|---|---|---|---|---|---|
| | | | | | |
| | | | | | |
| | | | | | |
| ... | ... | ... | ... | ... | ... |

RENDEZVOUS NAME: _____    RENDEZVOUS PLACE _____

| CHECKPOINT | 1 (NAME) | 2 (NAME) | 3 (NAME) | RENDEZVOUS PLACE |
|---|---|---|---|---|
| LOCATION ON MAP | | | | |
| POINT ESTIMATE | | | | |
| LOWER LIMIT OF POINT ESTIMATE | | | | |
| UPPER LIMIT OF POINT ESTIMATE | | | | |
| POINT ESTIMATE AND ESTIMATION INTERVAL | | | | |

COMMENT:

FIG. 18
(a)
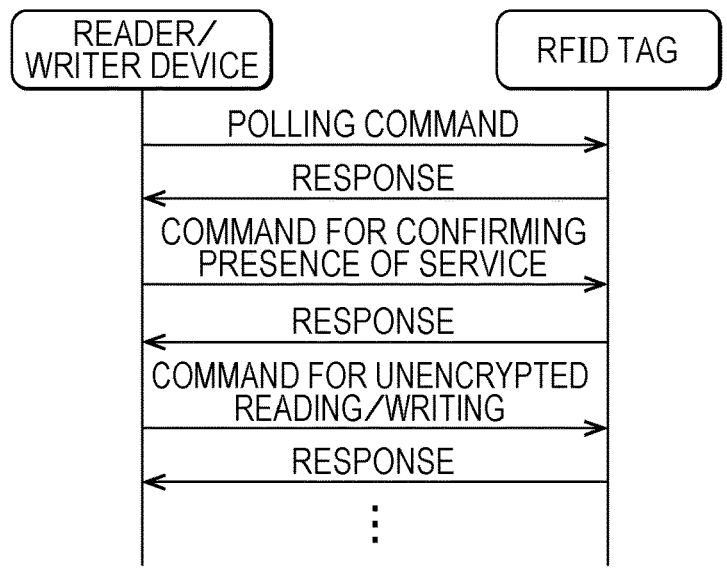
(b)
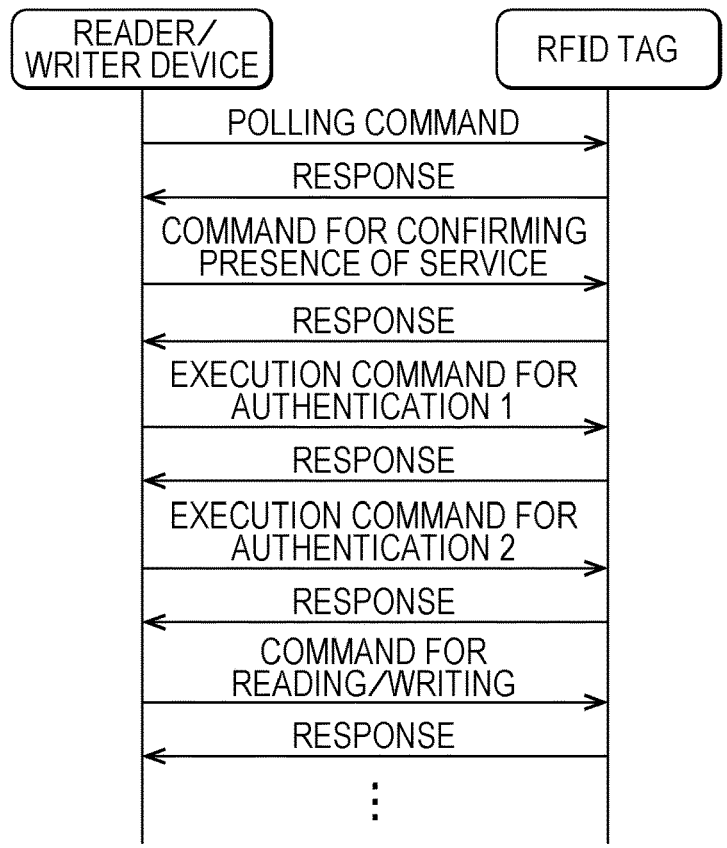

MOBILE TERMINAL, MOBILE TERMINAL PROGRAM, CHECKPOINT MANAGEMENT SYSTEM, AND CHECKPOINT MANAGEMENT METHOD

RELATED APPLICATIONS

This patent application is a U.S. National Phase Application under 35 U.S.C. Section 371 of International Application No. PCT/JP2015/79590, filed on Oct. 20, 2015, titled "MOBILE TERMINAL, MOBILE TERMINAL PROGRAM, CHECKPOINT MANAGEMENT SYSTEM, AND CHECKPOINT MANAGEMENT METHOD", which claims the benefit of Japanese Patent Application No. 2014-217002, filed on Oct. 24, 2014, which is hereby incorporated herein by reference in its entirety and for all purposes.

FIELD OF THE INVENTION

The present invention relates to mobile terminal communication technologies.

BACKGROUND OF THE INVENTION AND STATE OF THE ART

Communication technologies such as mobile terminals or mobile terminal programs that perform communication with apparatuses or devices having a reader/writer function for Radio Frequency Identification (RFID) tags are known. For example, in railway stations and the like, mechanisms are widely used in which an automatic ticket checking apparatus has a reader/writer function for RFID tags that contactlessly communicates with a user's Integrated Circuit ("IC") card serving as a ticket or a commuter pass to provide entry/exit, billing, and settling. A user can also use a mobile terminal such as a smartphone having a function of an RFID tag, instead of an IC card. In this discussion, terms including an IC tag and a "wireless tag" are sometimes collectively referred to as an "RFID tag".

A specific example of a mobile terminal technology is FeliCa® contactless RFID smart card technology described in Japanese Patent Application Laid-Open No. 10-20780 available from Sony Corporation, 1-7-1 Konan, Minato-ku Tokyo Japan. In the FeliCa® technology, communication between a reader/writer device and an IC chip mounted in a user's mobile terminal having an RFID tag function is controlled by respective control programs on the reader/writer device and the IC chip (these programs are sometimes represented by "FeliCa® programs"). The FeliCa® technology reader/writer device can be installed for example in an automatic ticket checking apparatus or a cash register in a store such as a convenience store. Examples of technologies having mechanisms similar to those in the FeliCa® technology include Mifare® contactless RFID smart card technology available from NXP B.V., High Tech Campus 60, Eindhoven, Netherlands 5656AG. In this discussion, the term "FeliCa®" is used to include the Mifare® contactless RFID smart card technology and the Mifare® control programs, unless specifically stated otherwise.

In the FeliCa® technology, a reader/writer having the FeliCa® program installed therein performs a sequence of RFID tag capture, exclusive communication, and authentication to determine whether or not the RFID tag has been authorized in advance. In the sequence of RFID tag capture and exclusive communication, the reader/writer device sends identification information such as ID information to the RFID tag, and the RFID tag responds to the reader/writer device when the RFID tag has identical identification information such as the ID information. It is therefore necessary for the RFID tag to store in advance identification information indicated by a reader/writer device with which the RFID tag wishes to communicate.

A mutual authentication sequence is also provided for communication that requires higher security, such as communication for billing and settling. In the mutual authentication sequence, the reader/writer device makes an inquiry to the RFID tag about identification information and determines whether or not the identification information matches identification information stored in advance in an apparatus or system including the reader/writer device. If a match is found, the reader/writer device further transmits identification information of the reader/writer device to cause the RFID tag to determine whether or not the identification information matches identification information set in advance in the RFID tag. Note that this communication is subjected to encryption processing. The reader/writer device decides whether or not the RFID tag is the one with which communication is allowed, from the mutual authentication result, and performs communication of necessary information with the RFID tag only when the RFID tag is authorized. Hence, to communicate necessary information, the RFID tag and the apparatus or system with the reader/writer device need to have pre-registration of a partner's identification information, such as ID information or an authentication key.

For the reasons described above, a user who possesses a mobile terminal including the FeliCa® program is required to grasp in advance information indicating which reader/writer device the mobile terminal of the user supports; that is, information indicating with which reader/writer device the RFID tag included in the mobile terminal is authorized to communicate. In some cases, the user is required to distinguish which of the functions of the RFID tag to use depending on the reader/writer device to be used.

For example, before railway carrier companies in Japan gave permission for interchangeable use of IC card tickets, users were required to use railway companies' own IC card tickets. To address such necessity, railway companies took measures to enable interchangeable use of IC card tickets, such as by adding, to a program for reader/writer devices in its automatic ticket checking machines or for its automatic ticket checking systems, a program for permitting use of other companies' IC card tickets; that is, RFID tags (or such as adding identification information or authentication information). Accordingly, in Japan users can currently use almost all the domestic railway companies with a single IC card ticket.

To realize interchangeable use, however, as described above, railway companies are required to add in advance, to reader/writer devices or automatic ticket checking systems, a program for approving other companies' RFID tags. Additionally, even if the program for approval is added, the same RFID tag is not available during, for example, travel across a number of railway companies (or geographic service areas), which may even at present require a user to still buy an ticket(s) to board a train(s) of such railway companies (or service areas).

In this respect, public transportation such as railway is typically operated by a substantially limited number of carriers, and there are almost no new carrier entrants or exits. Carriers add a program for providing capabilities to support RFID tags of other carriers (types) or register information such as identification information/authentication information to its reader/writer devices, systems, and the like in advance to comparatively easily support use of a number of types of RFID tags.

However, as use of RFID tags proliferates it is anticipated that users will possess various types of RFID tags, including those of companies other than railway companies. With use of increasingly greater number of RFID tags it is difficult for companies to have performed in advance operations, such as including in reader/writer devices or systems respective programs or identification information/authentication information which corresponds to various types of RFID tags possessed by numerous unspecified users in addition to the limited number of carriers.

Currently, railway companies and other companies make their applications public on their web sites and the like for allowing RFID tags in mobile terminals to communicate with reader/writer devices of such companies. Mobile terminal users are able to obtain and use the applications by, for example, downloading the applications; however, it is difficult to acquire and distinguishably use respective applications corresponding to a number of types of reader/writer devices, and it is actually impossible to obtain in advance all applications corresponding to numerous unspecified reader/writer devices of various types and to distinguishably use the applications. Even at present, reader/writer devices of carrier businesses are capable of basically communicating only with limited types of RFID tags, which thus results in having a limited range of uses thus thereby not being versatile in use. There occurs a problem in that expensive equipment might not be effectively used and the equipment remains prevalent only across large-scale carriers.

In this regard, consider for example not only RFID tags based on the FeliCa® program or Mifare® program but also the Host Card Emulation (HCE) function of the Android® Operating System (OS) on smartphones available from Google Inc., 1600 Amphitheatre Parkway Mountain View Calif. 94043. This is likewise not versatile in use, since the HCE function is also based on the Mifare® program and has a similar authentication function. The same applies to communication programs for a passive RFID tag and a reader/writer device of a medium-range communication type that uses Ultra High Frequency (UHF) waves.

Accordingly, it would be desirable to provide a mobile terminal having an RFID tag function that is capable of communicating with a number of types of reader/writer devices including control programs having a function of identifying or authenticating an RFID tag, a mobile terminal program used in the mobile terminal, and a checkpoint management system and method that use the mobile terminal and the mobile terminal program.

SUMMARY OF THE INVENTION

A mobile terminal that can be utilized for a checkpoint management system performs contactless electronic communication with a reader/writer device for a passive RFID tag. An application processing unit cooperates with an application server through electronic communication. A position information acquisition unit acquires current position information of the mobile terminal. A terminal controller or a RFID tag processing unit receives a signal related to a carrier wave or a command emitted from the reader/writer device which results in a trigger that causes the application processing unit to operate. The application processing unit acquires from the mobile terminal personal information and chronologic information. The application processing unit further transmits the information to the application server together with current position information. Information transmitted from the mobile terminal can be utilized as history information on the checkpoint from, through or at which the user departs, passes or arrives.

This Summary introduces concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description refers to the following accompanying drawings:

FIGS. 2(a) and 2(b) are diagrams illustrating an overview of example sequences of electronic communication between a reader/writer device and an RFID tag in an embodiment of the present invention.

FIGS. 5(a) and 5(b) depict diagrams illustrating an overview of the structure of a packet used for electronic communication between the reader/writer device and an RFID tag in an embodiment of the present invention.

FIG. 6 is a diagram illustrating an overview of an example screen on an application in an embodiment of the present invention.

FIG. 7 is a diagram illustrating an overview of an example setting selection screen for allowing a user to input information related to a route along which passage times are desired to be predicted in an embodiment of the present invention.

FIG. 8 is a diagram illustrating an overview of an example new addition screen for allowing a user to input information related to a route along which passage times are desired to be predicted in an embodiment of the present invention.

FIG. 9 is a diagram illustrating an overview of an example extraction-condition addition screen for allowing a user to input information related to a route along which passage times are desired to be predicted in an embodiment of the present invention.

FIG. 10 is a diagram illustrating an overview of an example rendezvous information addition screen for allowing a user to input information related to a route along which passage times are desired to be predicted in an embodiment of the present invention.

FIG. 13 is a diagram illustrating an overview of an example screen for providing a notification of the result of predicting a passage time and special sale information in an embodiment of the present invention.

FIGS. 18(a) and 18(b) are diagrams illustrating an overview of example electronic communication sequences between a reader/writer device and an RFID tag in the conventional art.

DETAILED DESCRIPTION OF EMBODIMENTS

Figure 1:
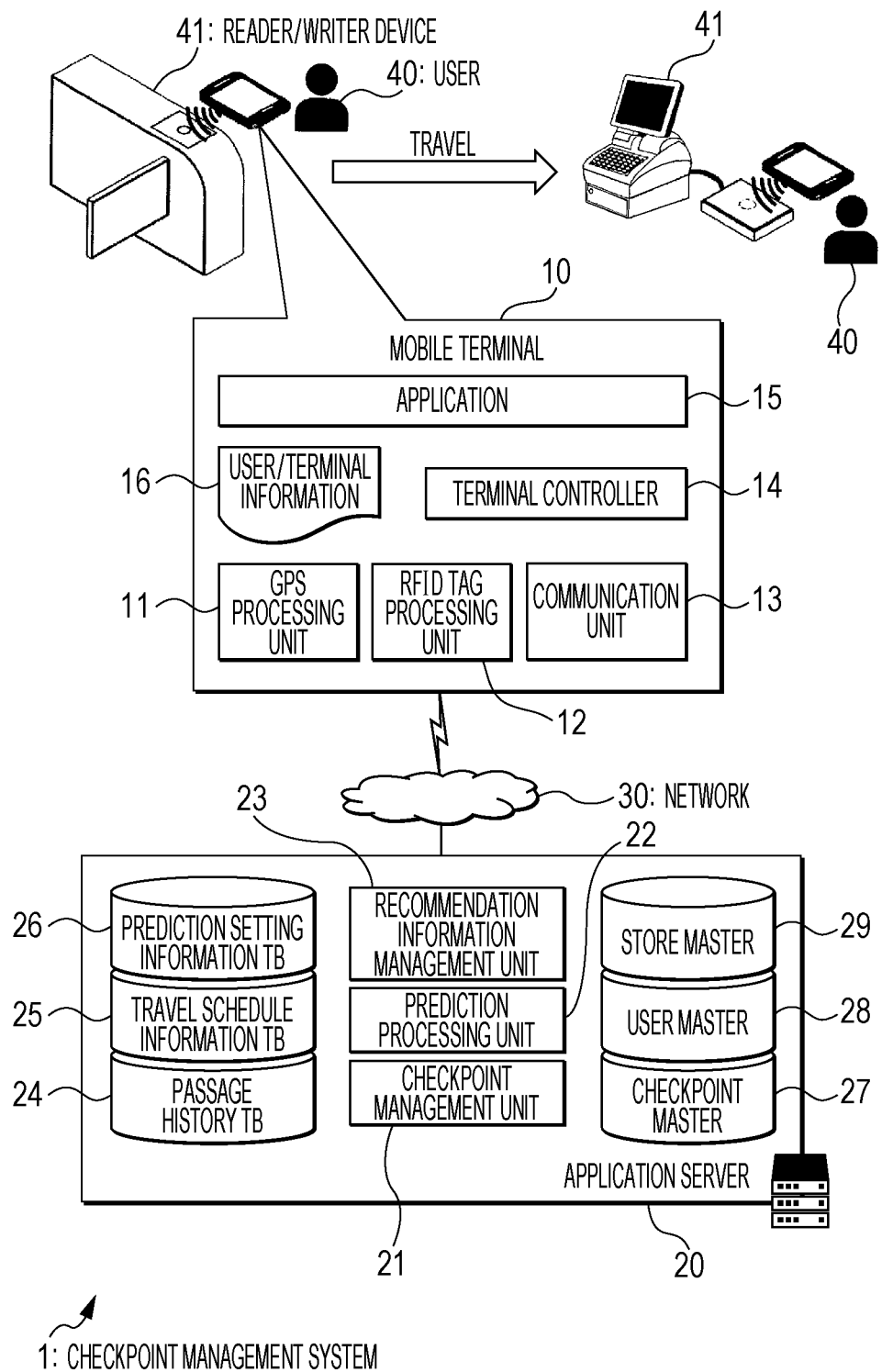
FIG. 1 is a diagram illustrating an overview of an example configuration of a checkpoint management system according to an embodiment of the present invention.

Embodiments of the present invention will be described in detail hereinafter with reference to the drawings. In all the figures of the drawings illustrating the embodiments, the same portions are basically assigned the same numerals and are not redundantly described herein. In the following, furthermore, the present invention will be described in comparison with the conventional art for easy understanding of the features thereof.

The present invention relates to technology effective for use in mobile terminals and/or mobile terminal programs that perform electronic communication with apparatus and/or devices having a reader/writer function for RFID tags and that serve as a passive RFID tag, and a checkpoint management system and/or a checkpoint management method that use such mobile terminals.

A typical embodiment of the present invention enables mobile terminals with an RFID tag function which are possessed by a large number of unspecified users to communicate with a number of types of reader/writer devices that include a control program having a function of identifying or authenticating an RFID tag. This enables diverse types of reader/writer devices which are widely prevalent in the world to expand use and to be exploited effectively. A mobile terminal according to a typical embodiment of the present invention is a mobile terminal that performs contactless electronic communication with a reader/writer device for a passive RFID tag. Such a mobile terminal can include an application processing unit, a position information acquisition unit, an RFID tag processing unit, and a terminal controller. The application processing unit cooperates with an application server through electronic communication. The position information acquisition unit acquires current position information of the mobile terminal. The RFID tag processing unit receives a signal related to a carrier wave or a command emitted from the reader/writer device and outputs a trigger. The terminal controller causes the application processing unit to operate in response to the trigger.

The application processing unit acquires, from the mobile terminal, personal information. The personal information can include identification information and chronologic information. The identification information can include identification information of a user of the mobile terminal or identification information of the mobile terminal. The chronologic information can include a date and time when the application processing unit operates or a date and time when the reader/writer device and the RFID tag processing unit perform communication. The application processing unit transmits the personal information such as the identification information and the chronologic information, which are acquired, to the application server together with the current position information acquired by the position information acquisition unit or information of a checkpoint related to the reader/writer device identified on the basis of the current position information.

The present invention can also be applicable to a program for causing an information processing apparatus to operate as the mobile terminal described above. In addition, the present invention can also be applicable to a checkpoint management system and a checkpoint management method including the reader/writer device, the mobile terminal, and the application server described above.

This brief overview, as well as corresponding summaries, are provided for convenience and are not intended to limit the scope of the claims.

In more detail, with reference to FIG. 18 example communication sequences obtained by a process of a control program for a reader/writer device and an RFID tag in the conventional art are described. Communication between a reader/writer device and a mobile terminal having a function of a passive RFID tag is initiated with a communication from the reader/writer device. A command (instruction) is transmitted to the RFID tag, and power is supplied to the RFID tag. FIG. 18(a) illustrates a sequence in which no authentication process is required (for example, no billing or settling is made); FIG. 18(b) illustrates a sequence in which an authentication process is performed (for example, billing and settling are made).

In either example, the reader/writer device initially performs a power supply function. The power supply function utilizes a carrier wave and transmits a communication command (for example, a polling command). Upon receipt of the carrier wave and the communication command, the RFID tag is activated by supplied power and transmits a response signal to the reader/writer device in accordance with the received communication command. At this juncture, the polling command includes identification information (for example, a "system code"). The RFID tag responds to the reader/writer device when a "system code" held in the RFID tag matches the "system code" included in the polling command.

The response signal can include Identification (ID) information (for example, a "manufacture ID (IDm)" or a "manufacture parameter (PMm)") contained in the RFID tag. The reader/writer device transmits a subsequent command (for example, a "command for confirming presence of service" in FIG. 18, etc.), which can include at least one of the pieces of received ID information. The RFID tag responds when the received ID information and ID information held in the RFID tag match. Accordingly, as a result, the reader/writer device is able to continuously (exclusively) communicate with the RFID tag that has transmitted a response signal in response to the polling command. With the use of this communication method, mutual authentication (for example, an "execution command for authentication 1" or an "execution command for authentication 2" in FIG. 18) and the reading/writing of data (for example, an "command for unencrypted reading/writing" or a "command for reading/writing" in FIG. 18) are subsequently performed to execute operations such as for example opening or closing a gate of an automatic ticket checking machine, billing and settling, and activating any other specific function (application program).

An irregular example is that the FeliCa® contactless RFID technology also provides a program for allowing the reader/writer device to, upon receipt of a response signal in response to a polling command, transmit a push command for activating an application. In this example, the reader/writer device and the RFID tag are also required to perform identification using the "system code" and the "manufacture ID (IDm)". In contrast, in an embodiment of the present invention, upon receipt of an initial command (for example, a polling command) from a reader/writer device, an RFID tag in a mobile terminal causes the mobile terminal to activate a specific application program preinstalled in the mobile terminal by using the command as a trigger.

Referring next to FIG. 2, diagrams illustrating an overview of example electronic communication sequences obtained by processes of control programs for a reader/writer device and an RFID tag according to an embodiment of the present invention are seen. As in the examples in FIG. 18, FIG. 2(a) illustrates a sequence in which no authentication process is required (for example, no billing or settling is made); FIG. 2(b) illustrates a sequence in which an authentication process is performed (for example, billing and settling are made).

In either example, as described above, upon receipt of a polling command, the RFID tag outputs a trigger for activating an application program to a terminal controller in the mobile terminal. In response to the trigger, the terminal controller activates a predetermined application program. In an embodiment of the present invention, the operation of the mobile terminal is specified by the activated application program. Accordingly, electronic communication between the reader/writer device and the RFID tag that occurs after the communication of the polling command does not have a meaning regardless of whether the communication has been established or not, resulting in substantially no difference between the communication sequences in FIGS. 2(a) and 2(b).

The application program to be activated has incorporated therein a function for acquiring personal information such as for example the ID of the user or the mobile terminal, position information of the mobile terminal, and information including the date and time of reception of the polling command. The application program also has incorporated therein in advance a function of communicating with a specific server and is capable of transmitting and receiving necessary information. Thus, for example, when the specific server is a server in a system to which the reader/writer device that has transmitted the polling command belongs, the specific server can automatically perform transaction processes in the system in accordance with the communication result.

For example, when the system is an entry and exit management system, it is possible to identify the position of a gate from the communication result and to automatically open or close the gate. By further example, when the specific server is a server for payment, it is possible to identify a payment location and a purchased service and/or goods and pay for the goods and/or service if payment information (for example, electronic money information, a credit card number, etc.) is held in the application program or has been acquired from a user.

That is, whereas functions and operations similar to those in the conventional art are consequently performed as long as individual systems or services (an entry and exit management system or a billing and settling service) are used with an RFID tag, in an embodiment of the present invention no identification or authentication process is performed between a reader/writer device and an RFID tag. This eliminates the need for the reader/writer device or the system to in advance register information on RFID tags with which communication is possible, resulting in no limitation on RFID tags available. As described above, since no identification or authentication process is required between a reader/writer device and an RFID tag, a user who possesses a mobile terminal having an RFID tag function is advantageously able to use various types of reader/writer devices installed in various locations, using the mobile terminal.

For example, a user who possesses a smartphone having an RFID tag function is able to use reader/writer devices installed in automatic ticket checking machines or gates in stations and airports, cash registers in convenience stores, coin-operated lockers, vending machines, entry and exit gates in offices and factories, and so forth. This eliminates the need for the user to hold and distinguishably use a number of RFID tags depending on the reader/writer devices. If an application program installed in the smartphone possessed by the user includes functions such as a function of identifying/authenticating ID information and so forth, a function of acquiring position information of the RFID tag, a function of identifying the electronic communication date and time, a function of billing and settling, and a function of communicating with a specific server, these functions are made feasible.

In addition, because even different types of reader/writer devices can communicate with the RFID tag, it is easy to set and use reader/writer devices as checkpoints for travel. For example, in an international flight departure airport reader/writer devices may sometimes be installed at check-in counters of airlines, a security check, an emigration, departure gates, and so forth; and in an arrival airport reader/writer devices may sometimes be installed at an immigration, customs, and so forth. Even when the individual reader/writer devices are managed by different organizations (for example, when reader/writer devices at check-in counters are managed by airlines whereas the emigration is managed by a government agency, when the departure airport and the arrival airport are located in different countries, etc.), consistent checkpoints can be easily established.

For example, in situations where it is difficult to share information between government agencies and commercial entities or between countries, individual reader/writer devices of different types are commonly installed. In an embodiment of the present invention, there is no need for identification or authentication processes between a reader/writer device and an RFID tag, which allows for advantageous effects similar to those achievable when uniform reader/writer devices of the same type are installed. In this situation, an advantage is tracking of a person or thing that travels internationally. For example, if a criminal escapes from one country to another country by passenger plane, it is possible to track the travel route of the criminal in the arrival airport in the other country in a way similar to that in a domestic airport.

In addition, it is possible to overcome a current problem of having to, for example, buy a ticket to board trains across two different railway companies (across two different service areas) in the same country such as for example Japan because an RFID-tag-based ticket is not interchangeably used. In this manner, a global system that facilitates collection, analysis, and use of big data can be configured.

According to an embodiment of the present invention, furthermore, it is possible to decrease the checkpoint installation costs. In the conventional art, provision of a reader/writer device that fits the respective type of RFID tags is required, the production volume of reader/writer devices is not large due to their specificity, and thus manufacturing costs are high. For example, in order to install a checkpoint that enables services for Suica™, which is an IC card in Japan issued by East Japan Railway Company, 2-2-2 Yoyogi, Shibuya-ku, Tokyo based on the FeliCa® technology, it is necessary to purchase a Suica™-service-enabled device. The Suica™-service-enabled device is a device for providing limited services and is thus expensive because of a low production volume due to its specificity.

In an embodiment of the present invention, in contrast, since there are no constraints caused by the types of RFID tags, a general-purpose reader/writer device can be used. In addition, manufacturing costs are low because of a high production volume. For example, a sample configuration of a low-cost device could be a general-purpose reader/writer device capable of being connected to a Personal Computer (PC) or the like via Universal Serial Bus (USB) which is commercially available as a computer peripheral, and a configuration in which the general-purpose reader/writer device is connected to a general-purpose PC can be used to install a checkpoint.

Currently, due to their high adoption/installation costs and low versatility, reader/writer devices are used mostly by large companies with abundant resources. For example, in the case of retailers, large-scale retail stores with franchisees or affiliates mainly use the reader/writer devices; however, once the costs for adoption/installation of reader/writer devices decline, even non-corporate stores or small- and medium-scale enterprises with small capital can easily adopt the reader/writer devices, and checkpoints can be present everywhere in the world.

Additionally, as the technology for prevention, prediction, tracking, etc. of accidents and crimes utilizing big data acquired from the checkpoints progresses, social activities such as trips, going shopping, and doing business will be more safely managed and efficiently performed. Currently, even electronic-money services are available in limited stores; however, if the adoption of low-cost, general-purpose reader/writer devices advances, circumstances where electronic money can be available at virtually every store in the world could be realized. This enables people to buy desired things in desired stores at any desired time without carrying cash.

The following describes a mobile terminal, a reader/writer device, and a checkpoint management system that uses the mobile terminal and the reader/writer device according to an embodiment of the present invention. This embodiment will be described utilizing as an example, but not limited to, (1) a reader/writer device that operates in accordance with the FeliCa® contactless RFID smart card technology (ISO/IEC 18092 Type F Standards promulgated by the International Organization for Standardization, ISO Central Secretariat, Chemin de Blandonnet 8, CP 401-1214 Vernier, Geneva, Switzerland), which is widely used for automatic ticket checking machines or gates and services such as for example payment with electronic money, and (2) a mobile terminal having an RFID tag function.

This embodiment can also be applied to, for example, a reader/writer device and a mobile terminal having an RFID tag function that operate in accordance with the Mifare® program (ISO/IEC 14443 Type A). This embodiment can also be applied to a mobile terminal having the Android® OS, since such a mobile terminal performs data communication in accordance with a process procedure substantially similar to that in the FeliCa® or Mifare® programs. Furthermore, this embodiment can also be applied to communication (for example, ISO/IEC 18000-6 Type B or C) between a passive RFID and a reader/writer device for medium-range communication that uses UHF waves.

In this embodiment, furthermore, use of the checkpoint management system will be described taking, as an example, the application to a system for predicting the passage time of a moving person or thing (hereinafter sometimes referred to as a "travel object") at a checkpoint; however, the same principals apply to the use of the system to any other similar system (for example, a customer flow monitoring system, etc.). Also, the same principals apply to the case for the application to various services in a system including a reader/writer device, such as for example opening or closing of an automatic ticket checking machine or a gate and billing and settling.

Referring to FIG. 1, a diagram illustrating an overview of an example system configuration of a checkpoint management system according to this embodiment of the present invention is seen. A checkpoint management system 1 can include, for example, a mobile terminal 10 possessed by a user 40 and having an RFID tag function, reader/writer devices 41 which are typically widely installed, and an application server 20 connected to a network 30 such as for example the Internet or intranets. The mobile terminal 10 is an information processing terminal such as a smartphone, for example, but may also be a non-smartphone device such as for example a mobile phone or a tablet. The mobile terminal 10 may not necessarily have a conversation function or other applications such as for example a tool or a game As described above, the mobile terminal 10, for example, is capable of communicating with various reader/writer devices 41 of an automatic ticket checking machine, a cash register in a store, and so forth serving as checkpoints. The mobile terminal 10 can include a GPS processing unit 11, an RFID tag processing unit 12, a communication unit 13, and a terminal controller 14, which are implemented as hardware and/or a software program(s) running on middleware for example such as an OS (not illustrated). The mobile terminal 10 can further include an application 15 that is a software program for performing an application process for services, such as for example a prediction of a passage time. The application 15 can also include general-purpose software, such as for example a web browser, for accessing a web server program (not illustrated) in the application server 20 via the network 30 and for performing a process related to an application. The application 15 may be preinstalled by, for example, the manufacturer of the mobile terminal 10 before shipment, or may be downloaded and installed from a predetermined sales/download web site by the user 40 after the purchase of the mobile terminal 10.

The GPS processing unit 11 can include a Global Positioning System (GPS) sensor (not illustrated), and a position information acquisition function for obtaining latitude/longitude information on the location of the mobile terminal 10. The RFID tag processing unit 12 serves as a passive RFID tag (not illustrated), and includes in this example a FeliCa® program for controlling RFID-based contactless electronic communication with the reader/writer devices 41. While the RFID tag processing unit 12 basically includes an IC chip for serving as an RFID tag, as described below, the RFID tag processing unit 12 can have a configuration not including an IC chip. The communication unit 13 can include a function of allowing the mobile terminal 10 to perform mobile wireless communication with a base station of a telecommunications company and to perform short-range wireless communication via wireless local area networking (Wi-Fi) or the like so as to be connected to the network 30, and other functions.

The terminal controller 14 includes a function of controlling the overall operation of the mobile terminal 10. In this embodiment, as described above, the terminal controller 14, for instance, performs control such as activating a predetermined application 15 in response to a trigger when the RFID tag processing unit 12 detects a polling command from the reader/writer device 41 and outputs the trigger.

The application 15 can comprise software that performs processes related to various types of services. In this embodiment, for example, the application 15 performs processes such as for example predicting a passage time to other checkpoints on the basis of information such as for example historical information about the arrival at a checkpoint formed by a reader/writer device 41, the passage of the checkpoint, the departure from the checkpoint, or the like (these events are hereinafter sometimes collectively referred to as "passage") and/or information on a travel schedule of the user 40. As described below, the application 15 may cooperate with the application server 20 to perform processing on the server side.

To perform the processes described above, the application 15 includes a function of acquiring personal information set and held as user/terminal information 16 in advance in the mobile terminal 10, such as for example the ID of the user 40 or the ID of the mobile terminal 10, and of performing identification/authentication. The application 15 also can include functions such as for example acquiring position information of the mobile terminal 10 via the GPS processing unit 11, identifying the date and time when the RFID tag processing unit 12 performed electronic communication via an OS, billing and settling, and communicating with a specific server via the communication unit 13.

The application server 20 is a server system created on a server device or a virtual server for cloud computing services. The application server 20 can include components, such as for example a checkpoint management unit 21, a prediction processing unit 22, and a recommendation information management unit 23, implemented as software running on middleware such as for example an OS, a DataBase Management System (DBMS), or a web server program (not illustrated). The application server 20 can further include data stores, such as for example a passage history table (table is hereinafter sometimes abbreviated as "TB") 24, a travel schedule information TB 25, a prediction setting information TB 26, a checkpoint master 27, a user master 28, and a store master 29, implemented as databases or the like.

The checkpoint management unit 21 includes a function of acquiring information indicating that the user 40 has passed a checkpoint formed by a reader/writer device 41; that is, the checkpoint management unit 21 acquires information indicating that the mobile terminal 10 possessed by the user 40 has communicated with the reader/writer device 41, from the mobile terminal 10 via the network 30 and of accumulating the acquired information in the passage history TB 24. The acquired information is accumulated in such a manner that the accumulation is performed for users 40 (that is, mobile terminals 10) registered in the user master 28 in units of trip reports described below. The checkpoint management unit 21 also includes a function of a user interface for performing processes, such as for example registration, deletion, and modification, on master information of checkpoints registered in the checkpoint master 27.

The prediction processing unit 22 includes a function of, in response to a request from the user 40 via the application 15 of the mobile terminal 10, predicting a departure, passage or arrival time at checkpoints located on a route along which the user 40 (that is, the mobile terminal 10) is scheduled to travel, on the basis of conditions set in the prediction setting information TB 26. (Note that departure, passage, and arrival times are hereinafter sometimes collectively referred to as a "passage time"). The determination of a passage time may include a determination with respect to a preceding checkpoint; the determination with respect to a preceding checkpoint may include a required time (a time spent by the user 40 who travels from the preceding checkpoint to another) determination of a difference in absolute times. The prediction processing unit 22 also includes a function of recording the prediction result in the travel schedule information TB 25, and of outputting the prediction result to the mobile terminal 10 via the application 15. In the prediction process, which is described in detail below, the prediction processing unit 22 determines a predicted passage time value on the basis of, for example, statistical information obtained from a history of travels between checkpoints for users 40 accumulated in the passage history TB 24, the conditions set in the prediction setting information TB 26, and the like.

The recommendation information management unit 23 includes a function of extracting, for a checkpoint on a route along which the user 40 is scheduled to travel, information on nearby stores and information on advertisements for special sales and the like held in the stores, which will be described in detail below, from the store master 29. The recommendation information management unit 23 includes a function of recording the extracted information in the travel schedule information TB 25 as recommendation information, and of outputting the recommendation information to the mobile terminal 10 via the application 15. The recommendation information management unit 23 also can include a user interface function for performing processes, such as for example registration, deletion, and modification, on master information and special sale information of stores registered in the store master 29.

Figure 3:
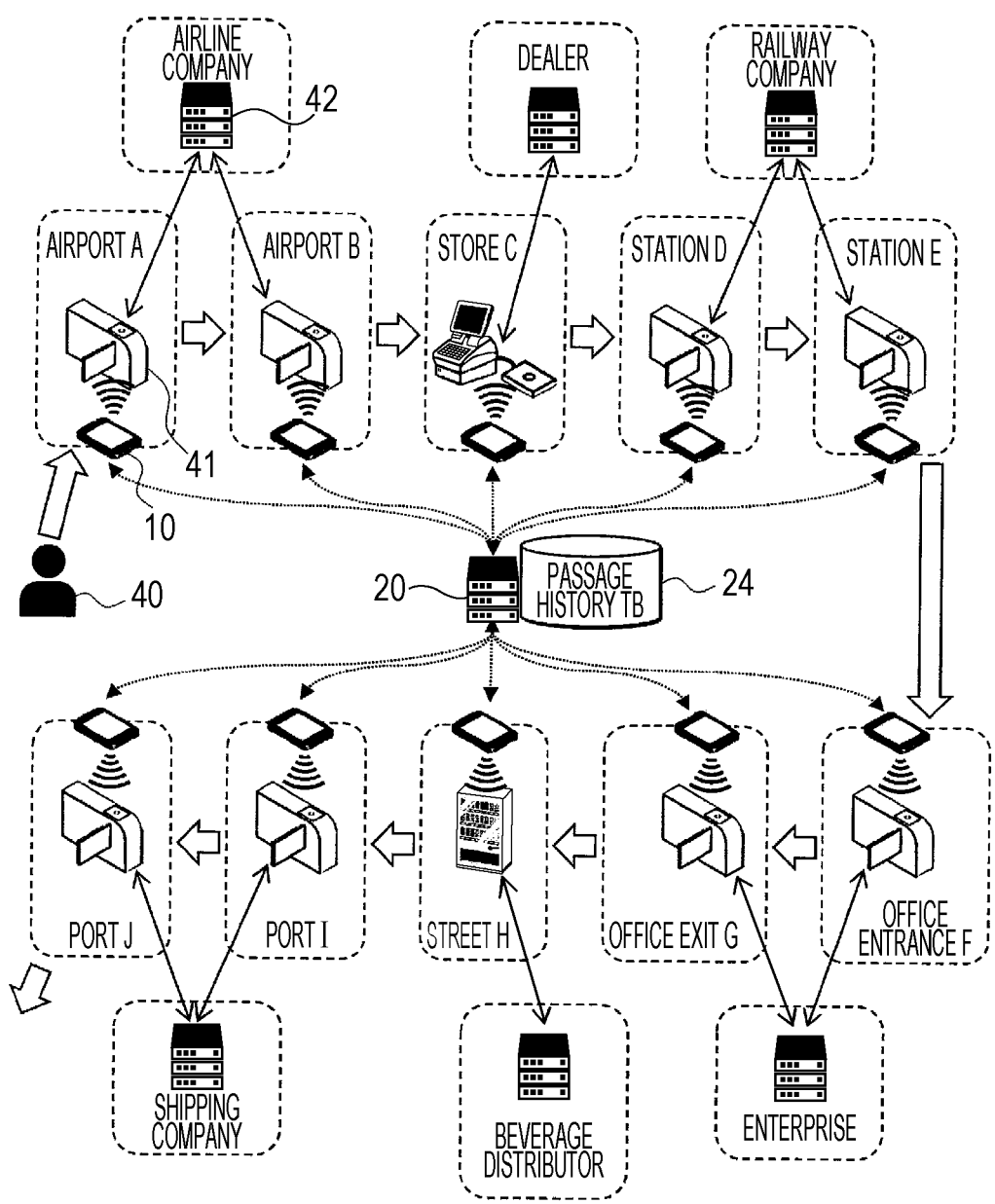
FIG. 3 is a diagram illustrating an overview of an example of a user possessing a mobile terminal who communicates with reader/writer devices installed in various locations in an embodiment of the present invention.

FIG. 3 is a diagram illustrating an overview of an example where the user 40, who possesses the mobile terminal 10, communicates with reader/writer devices 41 installed in various locations. In FIG. 3, by way of example, the user 40, who is a travel object, is a traveler and possesses a smartphone as the mobile terminal 10. The user 40 passes checkpoints in the order of an automatic gate in "Airport A", an automatic gate in "Airport B", a cash register in "Store C", an automatic ticket checking machine in "Station D", an automatic ticket checking machine in "Station E", an automatic gate at "Office Entrance F", an automatic gate at "Office Exit G", a vending machine on "Street H", an automatic ticket checking machine in "Port I", an automatic ticket checking machine in "Port J", and communicates with the associated reader/writer device 41 by using the same mobile terminal 10 when passing a checkpoint.

The application 15 of the mobile terminal 10 transmits the results of electronic communication with the respective reader/writer devices; that is, information indicating that the user 40 has passed a checkpoint associated with the reader/writer devices 41, to the application server 20 via the communication unit 13 over the network 30. The checkpoint management unit 21 of the application server 20 accumulates the information received from the mobile terminal 10 in the passage history TB 24.

On the other hand, the reader/writer devices 41 at the respective checkpoints are connected via networks such as for example the Internet or intranets to carrier servers 42, which are servers owned by, for example, operating carriers such as businesses (in the example in FIG. 3, an airline company, a dealer, a railway company, an enterprise, a beverage distributor, a shipping company, and the like) that manage systems including the reader/writer devices 41. For example, the reader/writer devices 41 in "Airport A" and "Airport B" are connected to the carrier server 42 in the same airline company. The carrier server 42 in the airline company grasps that the user 40 has performed electronic communication by using the mobile terminal 10 (has passed the automatic gate) in "Airport A", thereby being able to give instructions to the reader/writer device 41 (automatic gate) in "Airport B" to control the operation (for example, opening or closing the automatic gate, displaying a message, etc.).

The respective carrier servers 42 in the operating carriers may be capable of being interconnected via the network 30 or the like and may also be capable of being interconnected to the application server 20. The carrier servers 42 and the application server 20 may be consolidated into a single server system. The carrier servers 42 and the application server 20 communicate with each other to exchange information, thus enabling more appropriate control of the operation of the reader/writer devices 41 at the respective checkpoints in accordance with, for example, the status of the travel or position of the user 40.

Figure 4:
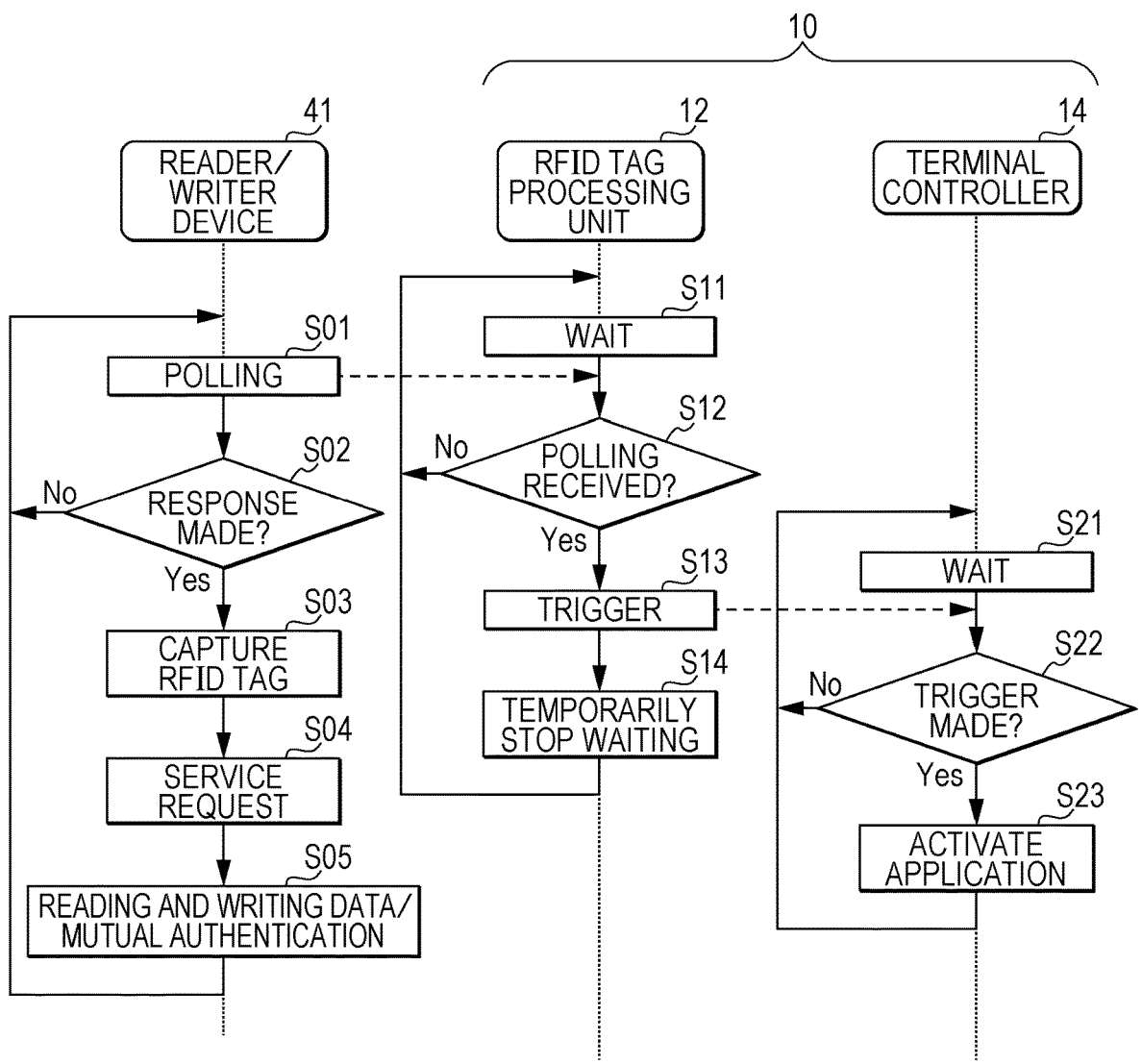
FIG. 4 is a flowchart illustrating an overview of an example process flow of electronic communication between a reader/writer device and the mobile terminal in an embodiment of the present invention.

FIG. 4 is a flowchart illustrating an overview of an example process flow of electronic communication between the reader/writer device 41 and the mobile terminal 10. The reader/writer device 41 in this example uses the FeliCa® program and the mobile terminal 10 includes an RFID tag function. In the example in FIG. 4, the reader/writer device 41, included in an automatic ticket checking machine, a cash register, or the like, is similar to that in the conventional art. As described above, first, the reader/writer device 41 performs power supply using a carrier wave and transmits a polling command (S01).

FIG. 5 depicts diagrams illustrating an overview of the structure of a packet used for electronic communication between the reader/writer device 41 and an RFID tag in the FeliCa® technology. In the data structure illustrated in FIG. 5(a), "packet data" can include a command packet or a response packet. In FIG. 5(b), the structure of these packets is illustrated. The polling command is included in the command packet. "Command data" of the polling command includes information on a "system code". The RFID tag responds with a response packet when a match is found between the information on the "system code" that is included in the received polling command and the information on the "system code" that is held in the RFID tag.

Referring back to FIG. 4, the reader/writer device 41 waits for a response packet from the RFID tag (the mobile terminal 10) until a preset time-out period has elapsed after the reader/writer device 41 transmitted the polling command. The reader/writer device 41 determines whether or not it has received the packet; that is, whether or not there is a response from the RFID tag (S02). Specifically, in the FeliCa® technology, "01h" is used as a response code in response to a polling command. Thus, if "01h" is set in the first 1 byte (response code) of the response packet received by the reader/writer device 41, then it is determined that a response has been made from the RFID tag. Otherwise, it is determined that no response is made. Then, the process returns to the step S01 and is repeatedly performed starting from the transmission of a polling command.

If it is determined in step S02 that a response has been made, then the reader/writer device 41 acquires ID information ("manufacture ID (IDm)") of the RFID tag included in the response data of the response packet and captures the RFID tag (S03). Thereafter, the reader/writer device 41 sets the ID information acquired in step S03 in packets of various types of commands such as for example for a service request, data read/write, and mutual authentication to continuously capture the RFID tag having the ID information in the series of processes.

Since the RFID tag does not respond when ID information included in a received command does not match ID information held in the RFID tag, the reader/writer device 41 consequently receives a response only from an RFID tag containing the ID information acquired in step S03; that is, the reader/writer device 41 communicates only with the captured RFID tag. The reader/writer device 41 performs transaction processes, such as for example control of the opening or closing of the automatic gate and payment using electronic money, on the basis of the result of the electronic communication. If the mobile terminal 10 includes a number of RFID tag functions (a number of types of system functions), each of the RFID tag functions is assigned unique ID information. Thus, the mobile terminal 10 responds if a match is found for the unique ID information on any of the RFID tag functions.

In this embodiment, the step S01 is used among the above-described steps for the reader/writer device 41, which are similar to those in the conventional art. Specifically, the RFID tag requires a polling command from the reader/writer device 41 in the step S01 and does not respond to the polling command. Accordingly, the reader/writer device 41 receives no response in the step S02. Thus, the reader/writer device 41 returns to the step S01 and repeatedly transmits the polling command. When the FeliCa® program is also mounted in parallel on the IC chip of the RFID tag processing unit 12, the IC chip makes a response. A service of an application activated by a trigger described below and a service activated by the FeliCa® program may be executed in parallel.

On the other hand, as illustrated in FIG. 4, the RFID tag (the RFID tag processing unit 12) held in the mobile terminal 10 first enters a state of waiting for a carrier wave and a command from the reader/writer device 41 (S11). Here, the RFID tag processing unit 12 activates its circuit by using a magnetic field between the reader/writer device 41 and the RFID tag (electromagnetic induction type) or by using electromagnetic radiation emitted from the reader/writer device 41 (radio wave method).

Then, the RFID tag processing unit 12 determines whether or not the received command is a polling command (S12). Specifically, in FeliCa® technology, "ooh" is used as a command code for a polling command. Thus, if "ooh" is set in the first 1 byte (command code) of the command packet received by the RFID tag processing unit 12, then the RFID tag processing unit 12 determines that the RFID tag processing unit 12 has received a polling command. If the received command is not a polling command, then the RFID tag processing unit 12 returns to the step S11 and continues waiting for a command to be received.

If it is determined in the step S12 that a polling command has been received, then the RFID tag processing unit 12 transmits a trigger for activating a predetermined application 15 to the terminal controller 14 (S13). Thereafter, the RFID tag processing unit 12 may temporarily stop waiting for a command to be received for a period until a preset waiting period has elapsed (S14). The waiting period is, for example, a period of time required for a predetermined application 15 to be activated and is set to, typically, but not limited to, approximately 0.5 seconds. After the waiting period has elapsed, the RFID tag processing unit 12 returns to the step S11 and continuously waits for a command to be received.

In the Mifare® program and Android® OS v4.4, which is based on the Mifare® program, a command received by an RFID tag from the reader/writer device 41 is referred to as an Application Protocol Data Unit (APDU) command, and a response from the RFID tag is referred to as APDU response. In Android® OS v4.4, typically, an APDU command that is initially transmitted from the reader/writer device 41 to an RFID tag is a "SELECT AID" command, which corresponds to a polling command in the FeliCa® program. In the FeliCa® program, information on the "system code" is included in the polling command; whereas, in Android® OS v4.4, an Application ID (AID) is included in the "SELECT AID" command. In the Mifare® program and Android® OS v4.4, accordingly, it is sufficient that the RFID tag generates a trigger upon receipt of an initially received APDU command such as for example a "SELECT AID" command.

As illustrated in FIG. 4, the terminal controller 14 of the mobile terminal 10 first enters a waiting state (S21), and checks at predetermined intervals whether or not a trigger has been received (S22). If no trigger has been received, then the terminal controller 14 returns to the step S21 and continues waiting. If a trigger has been received in the step S22, then the terminal controller 14 activates a predetermined application 15 (S23).

The method for activation of the application 15 may be to, for example, simultaneously activate the application 15 and display a predetermined screen, or to activate the application 15 in advance by the user 40 or the like and then display a predetermined screen upon receipt of the trigger (that is, here, it causes the application 15 to "operate"). The latter method requires, in advance, activation of the application 15 by the operation or the like of the user 40, but can reduce the time required to display the predetermined screen upon receipt of the trigger. In contrast, the former method does not require the operation or the like of the user 40, but involves simultaneous activation of the application 15 and display of the predetermined screen upon receipt of the trigger, which requires a longer time for processing.

When the user 40 initially activates the application 15 on the mobile terminal 10, the mobile terminal 10 displays a user registration screen (not illustrated) for registering personal information and the like of the user 40. When the user 40 completes user registration via the screen and the application server 20 has registered the information in the user master 28, the user 40 can use the application 15. The user registration screen may be included in the application 15 or may be included in the mobile terminal 10 separately from the application 15.

The personal information registered by the user 40 may include, for example, a user name, a nationality, a postal code, an address, a date of birth, a gender, a name, a telephone number, a fax number, an email address, an occupation, the presence of physical disability, a social security number, a credit/debit card number, biometric authentication information (such as for example a fingerprint(s), an iris(es), face information), membership information (such as for example an ID number assigned when the user 40 becomes a member of a service, a circle, or the like), a user ID/password, an ID of the mobile terminal 10, and the like.

If personal information requirements are already met by information input to the mobile terminal 10 by the user 40 at the purchase or the like of the mobile terminal 10, then the application 15 may automatically acquire this information and no user registration may be performed. In this example, the mobile terminal 10 acquires personal information and the like which the user 40 registered in the mobile terminal 10 when the user 40 initially activated the application 15. Upon the acquisition, there may be an additional step in which the mobile terminal 10 displays a confirmation message, for example, "The app acquires the input personal information. Do you agree with this?", etc., on a screen for gaining consent from the user 40.

When the user 40 inputs personal information and the like via the user registration screen and then gives instructions to transmit the input information by, for example, pressing a button on the screen, the mobile terminal 10 associates the user ID or the ID of the mobile terminal 10 with other personal information and the like or associates the pieces of personal information and the like with one another and transmits the information to the application server 20. At this time, the mobile terminal 10 may also record the personal information and the like in a predetermined storage area such as for example its non-volatile memory or the like. The application server 20 records the received information in the user master 28.

In this embodiment, as described above, the mobile terminal 10 receives a polling command from the reader/writer device 41 but does not authenticate ID information; that is, the mobile terminal 10 may have a configuration not including an IC chip or the RFID tag processing unit 12 to implement the RFID tag function. In this example, the processes performed by the RFID tag processing unit 12 (IC chip) can be performed by the terminal controller 14 instead. Specifically, the terminal controller 14 performs a process of checking, at a preset timing, whether or not an antenna included in the mobile terminal 10 has received a command, such as for example a polling command, from the reader/writer device 41. And if the antenna has received the command, then the terminal controller 14 performs a process of activating a predetermined application 15 or displaying a screen of the application 15.

Next, with reference to FIG. 6 an example of a process for screen content (recording of checkpoint) is described. FIG. 6 is a diagram illustrating an overview of an example screen of an application 15 in an embodiment of the present invention. The application in this example is activated by the terminal controller 14 in response to a trigger from the RFID tag processing unit 12 in the mobile terminal 10. In this embodiment, when a traveler who is the user 40 of the mobile terminal 10, such as for example a smartphone, having an RFID tag function travels with the mobile terminal 10, the mobile terminal 10 communicates with a reader/writer device 41 installed at checkpoints, and the application 15 transmits information on the checkpoint (the reader/writer device 41) and information on a date and time to the application server 20.

The application server 20 accumulates the acquired information in the passage history TB 24 and, when new checkpoint information is input, accumulates the information in the checkpoint master 27. The application server 20 also predicts a passage time of the user 40 who travels to another checkpoint from a checkpoint (or a required time between the checkpoints) by statistically processing the accumulated data. In addition, for instance, the application server 20 transmits the information related to a special sale(s) held by a vender, such as for example a store, together with the information on the predicted passage time to the user 40 who is scheduled to pass nearby during the special sale(s), based on the information of the predicted passage time for users 40.

The example screen illustrated in the example in FIG. 6 is a screen to record, as a trip report, that the traveler (user 40) has passed a checkpoint along a travel route. This screen is displayed on the monitor of the mobile terminal 10 having an RFID tag function, such as for example a smartphone. To establish electronic communication, the user 40 places the mobile terminal 10 in close proximity to a reader/writer device 41 at the checkpoints (for example, an automatic ticket checking machine of transportation, a cash register in a store, a coin-operated locker, an automatic gate for office room entry/exit control, etc.) which are provided with a variety of reader/writer devices 41.

The application 15 may directly generate and display the screen, or may access the application server 20 via the network 30 and display a web page generated by the application server 20. In the latter example, upon access from an external device including the mobile terminal 10, the application server 20 may request a user ID and password or an ID of the mobile terminal 10 and permit the access when a match is found between the user ID and password or the ID of the mobile terminal 10 and a user ID and password or an ID of the mobile terminal held in the user master 28.

If the "checkpoint detection date and time" item on the screen illustrated in the example in FIG. 6 is activated, then information on the date and time when the mobile terminal 10 of the traveler (the user 40) has communicated with the reader/writer device 41 at the checkpoint passed by the traveler is automatically set and displayed. Information on the date and time when the application 15 was activated (caused to operate) by a trigger may be automatically set and displayed. The following fields urge the user 40 to select or input information on the position of the checkpoint and related information, how the user 40 will travel from the checkpoint, and the like. If information on a new checkpoint is input, then the application 15 (or the application server 20) adds and shows the input values of the respective items for the new checkpoint to pull-down lists in the respective fields for the checkpoint on the example screen illustrated in FIG. 6 when the screen is generated next time and thereafter.

The "latitude, longitude" item may present values of the latitude and longitude that are automatically computed on the basis of information on a position on a map specified by the traveler (the user 40). The fields on transportation may be configured for enabling not only selection but also new input on transportation in a manner similar to that for the above-described fields for the checkpoint. In this example, the application 15 (or the application server 20) accumulates newly input transportation information in a transportation master or the like (not illustrated) and adds and shows the transportation information to pull-down lists in the respective fields on transportation when the example screen illustrated in FIG. 6 is generated the next time and thereafter. The pull-down list in the "type of transportation" field may include a travel method without transportation means, such as for example on foot. The screen may also allow selection/input of information that can affect the passage time of the user 40, such as for example weather information at the checkpoint, how frequently the user 40 uses this travel route, and the like.

The position identification function of the GPS processing unit 11 of the mobile terminal 10 may be used to identify position information of a checkpoint. If a checkpoint is located indoor or underground, then the following method may be used: for example, installing a position locator for GPS, a Wi-Fi antenna, an antenna for a mobile network, or the like in a portion, such as for example a ceiling, wall or column, on the floor on which the checkpoint is located and determining the latitude and longitude of the checkpoint by using triangulation or the like to identify the position of the mobile terminal 10.

The application 15 (or the application server 20 which has received a process request from the application 15) may search for and acquire, for example, based on information on the current position (the latitude and longitude) of the user 40 obtained by the GPS processing unit 11, information on a checkpoint at a position corresponding to or within a predetermined distance (for example, within a radius of 100 meters or 109 yards) from the current position of the user 40 from the checkpoint master 27 in the application server 20. The application 15 can display the information including the name of the checkpoint on the screen. As illustrated in the example screen illustrated in FIG. 6, the application 15 may allow an appropriate checkpoint to be selected among a number of candidate checkpoints by using a pull-down list or the like, or may allow a new checkpoint to be input if no appropriate checkpoint is found.

The application 15 can also record, as a trip report, biometric authentication information on the user 40 when the mobile terminal 10 has communicated with the reader/writer device 41 at the checkpoint. For example, the application 15 may acquire the iris, face or fingerprint information, or the like of the user 40 by using the camera function, the scanner application, or the like included in the mobile terminal 10, and may transmit the information to the application server 20 in association with any other information. In this example, the screen illustrated in the example in FIG. 6 can include for example a button or the like (not illustrated) for acquiring and approving the iris, face or fingerprint information, or the like and urges the user 40 to set their eyes, face, finger(s), or the like at positions at which images can be captured by the camera or the scanner and to press the button. The user 40 presses the button, thereby allowing the mobile terminal 10 to acquire information on (to capture an image of) the iris(es), face, fingerprint(s), or the like.

The user 40 inputs information on a checkpoint, information on how the user 40 will travel from the checkpoint, biometric authentication information on the user 40, and the like via the screen illustrated in the example in FIG. 6, and then activates by, for example, pressing a "transmit" button. Then, the application 15 associates the input, selected, and automatically displayed information with the personal information of the user 40 (at least the ID of the user 40 or the mobile terminal 10) as a trip report or associates the pieces of information in trip report information on the user 40 with one another and transmits the information pieces to the application server 20. The application server 20 assigns an ID or a sequence number to received trip reports and records the trip report in the passage history TB 24.

Thereafter, the mobile terminal 10 terminates the application 15. As to termination, for example, in the example where the terminal controller 14 activated the application 15 and displayed a predetermined screen in accordance with a trigger output from the RFID tag processing unit 12, the mobile terminal 10 terminates both the application 15 and the screen. In the example where the application 15 had already been activated and the terminal controller 14 displayed a predetermined screen in accordance with a trigger, the mobile terminal 10 terminates the display of the predetermined screen.

Next, with reference to FIGS. 7-10 an example of a process for screen content (setting of predicted passage time) is described. FIGS. 7 to 10 are diagrams illustrating an overview of example screens on the application 15 of the mobile terminal 10 for allowing the user 40 to input information related to a route along which passage times are desired to be predicted. FIG. 7 depicts a screen on which the user 40 selects conditions for extracting information which the prediction processing unit 22 of the application server 20 needs to perform prediction. Here, the user 40 selects setting contents from saved setting contents of previous predictions or from setting contents registered in advance. By enabling the user 40 to select the contents, the screen can eliminate the need of the user to input/set conditions when the user repeatedly performs the process for a prediction with the same contents. The example in FIG. 7 depicts that "Setting 002" is currently being selected as setting contents.

In order to set information related to a new route or any other condition, the user 40 activates by, for example, pressing an "add new setting" button on the screen illustrated in FIG. 7. Accordingly, a screen as illustrated in FIG. 8 for adding new settings is displayed. Here, fields are provided for allowing the user 40 to input/select information on checkpoints (for example, a start checkpoint, a connecting checkpoint(s), and an end checkpoint) installed on a route along which the user 40 is scheduled to travel, and information related to means of travel between the checkpoints. Here, examples of items displayed in pull-down lists in FIGS. 8 to 10 include those recorded in tables such as for example the checkpoint master 27, the transportation master (not illustrated), and the user master 28. On the example screen illustrated in FIG. 8, furthermore, a value of the "allocation number" item may be automatically set and displayed by the application 15.

In addition, the user 40 can also set additional conditions for extracting information used for the application server 20 to predict a passage time. For example, when the user 40 selects the "set detailed conditions for extraction" item on the example screen illustrated in FIG. 8, a screen as illustrated in FIG. 9 for setting additional extraction conditions is displayed. Here, the user 40 inputs/selects necessary information, thereby enabling data for prediction to be extracted under conditions more suitable for the travel conditions of the user 40.

In addition, when the user 40 has a person to meet at a destination, the user 40 can set information on the address to which information for the person is transmitted in addition to information on the person, a rendezvous name, and a rendezvous place so that the information on the predicted passage time can also be provided to and shared with that person. For example, when the user 40 selects the "set rendezvous information" item on the example screen illustrated in FIG. 8, the application 15 displays a screen as illustrated in FIG. 10 for setting rendezvous information. Here, the user 40 inputs/selects an email address of the person whom the user 40 will meet and information on a rendezvous checkpoint, thereby also enabling the person whom the user 40 will meet to know a predicted arrival time of the user 40 at the rendezvous place (rendezvous checkpoint), and enabling a more efficient rendezvous. In FIG. 10, information on checkpoints included in pull-down lists in the rendezvous checkpoint fields may show information respectively selected by the user 40 on the example screen illustrated in FIG. 8 as the start checkpoint, the connecting checkpoint(s), and the end checkpoint.

When the user 40 inputs/selects necessary information and then activates by, for example, pressing a "set" button on the example screen illustrated in FIG. 8, the application 15 associates the input, selected, and automatically displayed information with the personal information of the user 40 (at least the ID of the user 40 or the mobile terminal 10) or associates the pieces of information above including the personal information of the user 40 with one another and transmits the information to the application server 20. The application server 20 records the received prediction setting information in the prediction setting information TB 26.

In the foregoing example, although a screen for inputting/selecting contents of travel prediction settings is constituted by separate portions in FIGS. 7 to 10, the present invention is not limited to such an embodiment. All the pieces of information may be input/selected via a single screen, or the screen may be divided by units different from those in the example described above. Additionally, the respective screens illustrated in FIGS. 7 to 10 may be generated directly and displayed by the application 15, or the application 15 may access the application server 20 via the network 30 and display a web page generated by the application server 20.

In the latter case, upon access from an external device including the mobile terminal 10, the application server 20 may request a user ID and password or the ID of the mobile terminal 10 and permit the access when a match is found between the user ID and password or the ID of the mobile terminal 10 and a user ID and password or a mobile terminal ID held in the user master 28. The traveler (the user 40) may access the application server 20 from a fixed terminal (not illustrated), rather than from the mobile terminal 10, to display the screens illustrated in FIGS. 7 to 10.

The prediction processing unit 22 of the application server 20 computes information on a predicted passage time in accordance with the setting content described above. The prediction processing unit 22 performs extracting data necessary for prediction and computes the prediction immediately before, for example, the application server 20 transmits information on the predicted passage time or special sale information described below to the user 40 or a person whom the user 40 will meet via electronic mail.

The application server 20 accumulates in the passage history TB 24 the information on a checkpoint (the reader/writer device 41) and a passage time at the checkpoint (the date and time of detection of electronic communication) input by the user 40 through the screens described above during travel via the mobile terminal 10. Accordingly, as to computation of a predicted passage time, the prediction processing unit 22 determines extraction conditions on the basis of the contents set in the prediction setting information TB 26 (such as for example checkpoints input/selected by the user 40, a means of transportation that the user 40 will use, and additional extraction conditions) and extracts corresponding trip reports for users 40 from the passage history TB 24. Furthermore, the prediction processing unit 22 acquires passage times at checkpoints. Then, the prediction processing unit 22 computes for checkpoints the mean value of the passage times and a value(s) given by the mean value plus and/or minus (±) 3 sigma, where the sigma is used for the standard deviation of the passage times.

The mean value may be substituted by the median or mode (in particular, when the number of data is large, these three indicate equivalent values and are thus interchangeable). In addition, 3 sigma may be changed to, for example, 0 sigma, 1 sigma, 2 sigma, 4 sigma, or the like depending on the degree of certainty desired for prediction. In the computation for prediction, furthermore, a predicted value or a confidence interval or prediction interval obtained by multivariate analysis may be used in place of computation of the mean value or standard deviation. The result of predicting a passage time is obtained in such a manner that, for example, (the mean value) represents the point estimate of passage times, (the mean value minus (−) 3 sigma) represents a lower limit of the point estimate, and (the mean value plus (+) 3 sigma) represents an upper limit of the point estimate. To determine a point estimate of the required times between checkpoints instead of determining the point estimate of the passage times, for example, the prediction processing unit 22 subtracts a passage time at a preceding checkpoint from a passage time at an arbitrary checkpoint to determine the required time involved in passage between the two checkpoints and processes the required times statistically in a similar manner. More specifically, reference is made to Japanese Patent No. 5129414 or Japanese Patent No. 5174993, for example, the disclosures of which is incorporated herein by this reference.

Figures 11, 12:
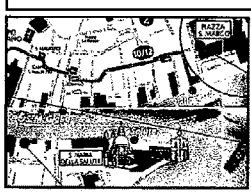
FIG. 11 is a diagram illustrating an overview of an example setting selection screen for allowing a seller or the like in a store to input special sale information in an embodiment of the present invention.
FIG. 12 is a diagram illustrating an overview of an example new addition screen for allowing a seller or the like in a store to input special sale information in an embodiment of the present invention.

Next, with reference to FIGS. 11-13 an example of a process for screen content (setting of advertisement for special sale information) is described. FIGS. 11 and 12 are diagrams illustrating an overview of example screens for allowing a seller or the like in a store (that is, in this embodiment, an advertiser) to input special sale information. For example, the recommendation information management unit 23 of the application server 20 generates the screens by using a web server program (not illustrated) and displays the screens via a web browser or the like on an information processing terminal operated by the seller or the like in the store. The information processing terminal used here may be either portable or fixed.

In response to access from the seller or the like, the recommendation information management unit 23 of the application server 20 generates a user registration screen (not illustrated) for prompting registration of the user ID and password of the seller, personal information of the advertiser including for example category information, and the like and displays the user registration screen on the information processing terminal. The personal information can include, for example, the information of the name of the seller, the name of a person in charge, the name of a department, a job title, an address, a postal code, a telephone, a FAX, an email address, a homepage or an advertising web page, and the like. When the seller inputs necessary information, the information processing terminal associates the user ID with any other user registration information or associates the pieces of user registration information with one another and transmits the information to the application server 20. The application server 20 records the received user registration information in the user master 28 or the like.

Thereafter, the recommendation information management unit 23 of the application server 20 displays a screen for prompting the seller to input or set setting information related to the output of an advertisement for the special sale information. FIG. 11 depicts a screen on which a user who is the seller selects setting contents for an advertisement for the special sale information. Here, the user who is the seller selects setting contents from the saved setting contents for previous advertisements or from setting contents registered in advance. Since setting contents can be selected, the seller can eliminate the need for inputting/setting contents when the seller places an advertisement having the same contents repeatedly. The example in FIG. 11 depicts that "Ad 001" is currently being selected as setting contents.

In order to set contents of a new advertisement for special sale information, the seller activates by, for example, pressing an "add new ad" button on the screen illustrated in FIG. 11. Accordingly, the recommendation information management unit 23 displays a screen as illustrated in FIG. 12 for adding a new advertisement. Here, fields are provided for allowing the seller to input/select information on a special sale and on goods and/or services on which the seller plans to hold the special sale, and information such as for example output conditions for the advertisement. The recommendation information management unit 23 may automatically set and display values at the "ad No." and "latitude, longitude" items. When the seller inputs/selects necessary information and then activates by, for example, pressing a "set" button on the example screen illustrated in FIG. 12, the information processing terminal operated by the seller associates the input, selected and automatically displayed information with at least the user ID of the seller or associates the pieces of information above including the user ID of the seller with one another and transmits the information to the application server 20. The application server 20 records the received information on the advertisement settings in the store master 29 or a special sale information table or the like (not illustrated).

In the application server 20, the prediction processing unit 22 performs the process described above to compute a predicted passage time of the user 40, and then the recommendation information management unit 23 extracts special sale information. The conditions for extraction are set in advance as a relationship between the predicted passage time at checkpoints and the duration of the special sale. For example, if the duration of a certain special sale includes an estimation interval (the range between the lower and upper limits of the point estimate) on a passage time which is computed for a certain checkpoint and if the location of the special sale is within a predetermined distance from the position of the checkpoint, then information related to the special sale is extracted and provided to the mobile terminal 10 of the user 40 together with information on the result of predicting a passage time.

More specifically, it is assumed that, for example, the prediction processing unit 22 of the application server 20 has extracted passage times at "Checkpoint A", which are accumulated in the passage history TB 24, on the basis of information input on the prediction setting screens illustrated in FIGS. 7 to 10 (the information registered in the prediction setting information TB 26) by "User B" and has computed a predicted passage time to be "3:00 p.m. plus or minus (±) 10 minutes" (this information is recorded in the travel schedule information TB 25), as a result of computation of the predicted passage time.

On the other hand, it is assumed that, for example, information indicating that "Store (Seller) C", which is located within a radius of for example 1 kilometer or 0.62 mile from "Checkpoint A", will hold a special sale from "2:00 p.m. to 4:00 p.m." has been registered in the store master 29 or the like as special sale information. In this example, the application server 20 informs "User B" of information on the prediction result ("User B" will pass "Checkpoint A" at "3:00 p.m. plus or minus (±) 10 minutes") and the special sale information (a special sale will be held at "Store C" from "2:00 p.m. to 4:00 p.m.") via electronic mail. The email address of "User B", which is registered in the user master 28 in the application server 20, may be used. If "User B" has registered the email address of a person whom "User B" will meet on the screens illustrated in FIGS. 8 and 10, then the application server 20 may also inform the person of similar content via electronic mail.

Next, with reference to FIG. 13 an example of a process for screen content (result of travel prediction) is described. FIG. 13 is a diagram illustrating an overview of an example screen for notifying the user 40 and a person whom the user 40 will meet of the result of predicting a passage time and special sale information. This screen may be directly displayed as the content of the electronic mail to be delivered to the user 40 and the person whom the user 40 will meet, for example, or may be generated by a web server program (not illustrated) in the application server 20 and displayed on the mobile terminal 10 of the user 40 via an URL (Uniform Resource Locator) which is included in the electronic mail and by which the application server 20 displays the screen.

In the example in FIG. 13, a table given in the lower part indicates, in list view, information on predicted passage times at "Checkpoint 1" to "Checkpoint 3" and a rendezvous place, and a table given in the upper part indicates information on sellers (advertisers of special sales) who will hold the special sales on goods and/or services at the predicted passage times of the respective checkpoints. An addressee may be automatically set and displayed at an item at the top of the screen by the application server 20. The example in FIG. 13 depicts the case where the user 40 is scheduled to travel along a route in such a manner that the user 40 will pass "Checkpoint 1" to "Checkpoint 3" and meet someone at the final checkpoint (that is, four checkpoints in total for departure, passage, and arrival). There may be a case that the user 40 meets someone at the initial checkpoint or an intermediate checkpoint. Of course, the number of checkpoints is not limited to four.

The application server 20 transmits an electronic mail including the content of the screen (or URL) described above to the intended user 40 and the person whom the user 40 will meet at a predetermined timing. The electronic mail is transmitted, for example, immediately after the user 40 has performed setting for predicting a passage time or at a timing that is on a day of the week selected by the user 40 in the "day of week to apply" field within the "please set saving conditions" section on the screen illustrated in FIG. 8 and that is a predetermined time (for example, 5 hours) before the predicted passage time at "Checkpoint 1", which is the first checkpoint along the travel route. This enables the user 40 and the person whom the user 40 will meet to predict in detail the time required for travel before they actually start the travels and also to grasp in advance information on a special sale(s) that will be held near the travel route.

Special sales are typically used to encourage shoppers to come to stores even if the shoppers must incur their travel costs (store-visit-incurred costs). Shoppers buy goods on special sale and further goods at a store, thus allowing a seller to increase profits. Providing special sale information for a traveler (the user 40) who is expected to pass nearby the location of a special sale for the duration of the special sale means providing special sale information for a user 40 who can come into that location with no or low travel costs. In this situation, the user 40 evaluates the special sale information as more valuable than do other people who are provided with the special sale information. This increases the probability that the user 40 will come into a store or the like of the seller who holds the special sale, leading to effective sales promotion for the seller. In this embodiment, information on a special sale held by a seller is used by way of example, but not limited to, as information to be recommended to the user 40. An application to recommendations of information, such as for example events, that are beneficial for a user 40, traveler, may be made.

In the checkpoint management system 1 according to this embodiment of the present invention, as described above, the mobile terminal 10 having an RFID tag function activates a predetermined application 15 to perform processing by receiving a command such as for example a polling command from the reader/writer device 41 as a trigger, so the mobile terminal 10 can communicate with a number of types of reader/writer devices 41. By using this mechanism, for example, the user 40, such as for example a traveler who travels with the mobile terminal 10 performs electronic communication between the mobile terminal 10 and various reader/writer devices 41 at checkpoints in regions and grasps history information of dates and times of passage at the respective checkpoints.

In addition, based on the history information, the checkpoint management system 1 determines predicted passage times at respective checkpoints in the travel schedule of the user 40, provides information on the predicted passage times for the user 40 and a person whom the user 40 will meet, and can assist reducing the waiting time caused during, for example, a transfer or rendezvous and implementing an efficient travel of the user 40. Furthermore, the checkpoint management system 1 recommends event information such as for example a special sale that will be held along or nearby the travel route of the user 40 on the basis of information on the place and time where and when the special sale(s) or the like is scheduled to be held by a seller(s) and information on the predicted passage times of the user 40 at respective checkpoints. This can assist the user 40 in, for example, purchasing economical goods and/or services during travel, and enables not only the user 40 (such as for example a traveler) but also an event provider (such as for example a seller) to increase profits.

The following describes a mobile terminal, a reader/writer device, and a checkpoint management system that uses the mobile terminal and the reader/writer device according to another embodiment of the present invention. In the prior embodiment described above, the mobile terminal 10 is configured to, upon receipt of a command transmitted from the reader/writer device 41, such as for example a polling command, activate the application 15 by using the command as a trigger. In this embodiment, in contrast, as described below, the mobile terminal 10 is designed such that the terminal controller 14 activates the application 15 by receiving a trigger which is caused by the activation of a circuit of the RFID tag processing unit 12 which uses an electromotive force obtained from a carrier wave rather than a polling command from the reader/writer device 41.

Figure 14:
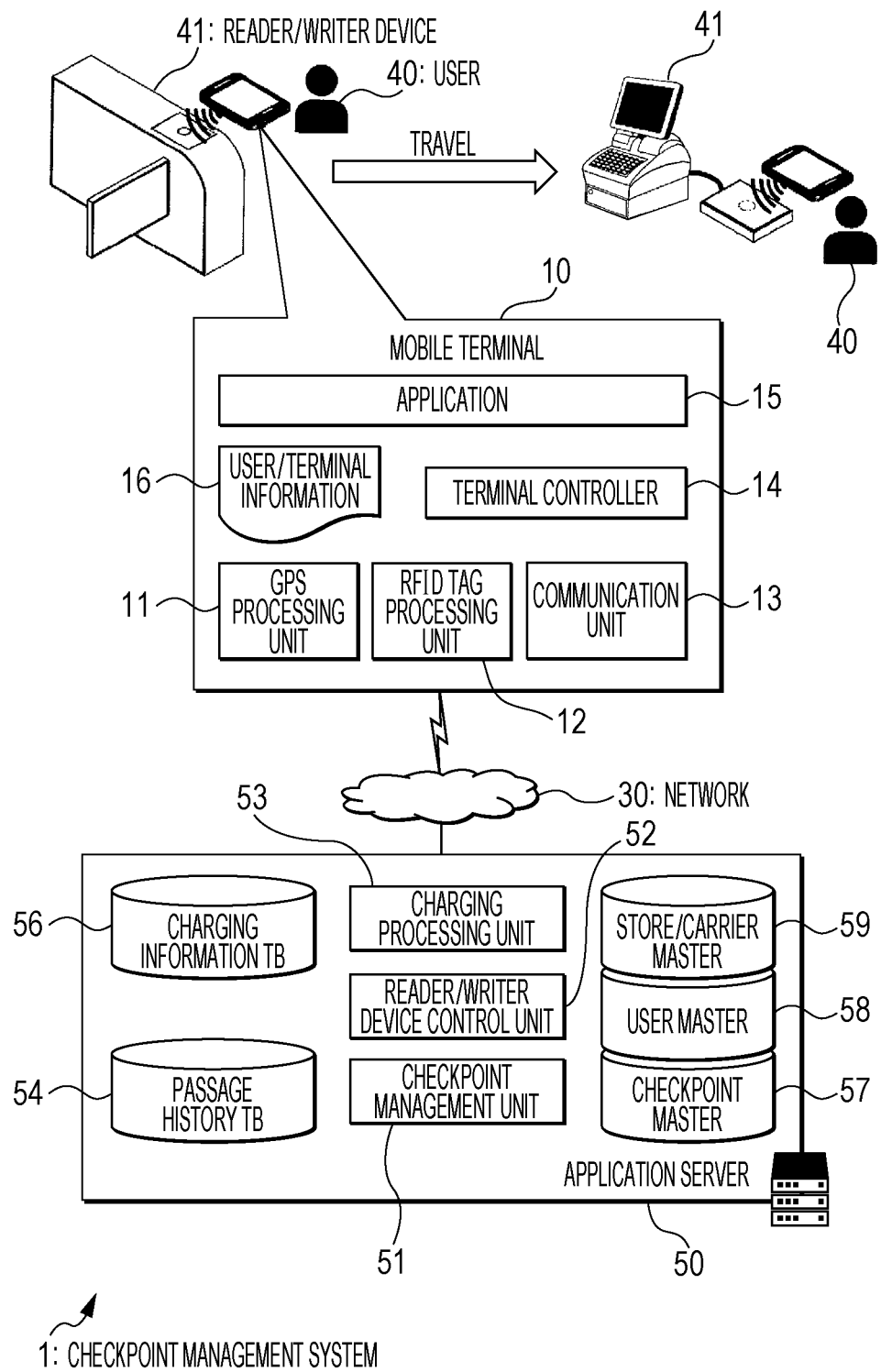
FIG. 14 is a diagram illustrating an overview of an example configuration of a checkpoint management system according to another embodiment of the present invention.

Referring to FIG. 14, a diagram illustrating an overview of an example system configuration of a checkpoint management system according to this embodiment of the present invention is seen. This embodiment basically has a configuration similar to that in the prior embodiment described above. In the prior embodiment, the application 15 and the application server 20 implement services, such as for example predicting a passage time at a checkpoint and providing special sale information in accordance with the prediction result. This embodiment is also applicable to such services; however, this embodiment provides implementations of other applicable services such as for example a service for controlling the opening or closing of an automatic gate and charging the user 40 money. It is to be understood that this service can also be applied in the configuration of the prior embodiment described above.

In the example in FIG. 14, to implement the service described above, an application server 50 can include components implemented in software running on middleware such as for example an OS, a DBMS, or a web server program (not illustrated), including a checkpoint management unit 51, a reader/writer device control unit 52, a charging processing unit 53, and the like. The application server 50 can further include data stores implemented as databases and the like, such as for example a passage history TB 54, a charging information TB 56, a checkpoint master 57, a user master 58, and a store/carrier master 59.

The checkpoint management unit 51 and the tables, namely, the passage history TB 54, the checkpoint master 57, and the user master 58 are respectively similar to the checkpoint management unit 21 and the tables, namely, the passage history TB 24, the checkpoint master 27, and the user master 28 in the prior embodiment described above and illustrated in FIG. 1, and thus are not described in further detail herein. While the user master 28 in the prior embodiment holds personal information of the user 40 and sellers (that is, advertisers), the user master 58 in this embodiment may hold personal information of the user 40.

The reader/writer device control unit 52 can include a function of remotely controlling, based on passage information for a checkpoint which is acquired from the application 15 of the mobile terminal 10 of the user 40 via the network 30, the operation of a reader/writer device 41. The reader/writer device 41 can be installed as the checkpoint or installed as a checkpoint through which the user 40 is scheduled to travel. For example, the reader/writer device control unit 52 indirectly controls the individual reader/writer devices 41 by transmitting information related to control to a carrier server 42 in a system to which the intended reader/writer device 41 belongs via the network 30 or the like.

The charging processing unit 53 can include a function of performing, based on information such as for example a passage information for a checkpoint which is acquired from the application 15 of the mobile terminal 10 of the user 40 and information registered in the store/carrier master 59 or the like, a process for making a charge, bill, for using services corresponding to the checkpoint (for example, purchase of goods, etc. with electronic money, visit to a facility, etc.) and recording the result in the charging information TB 56. The charging processing unit 53 may be configured to be connected to a system or the like (not illustrated) in a business that runs the intended services (for example, a system, network, etc. in a financial institution such as for example a credit/debit card company) to perform processing.

As in the prior embodiment described above, carrier servers 42 in the operating carriers, or operating businesses, may be capable of being interconnected via the network 30 or the like or may be capable of being also interconnected to the application server 50. The carrier servers 42 and the application server 50 may be consolidated into a single server system. The carrier servers 42 may also be consolidated with servers, etc. included in systems in financial institutions that provide billing and settling services.

Figure 15:
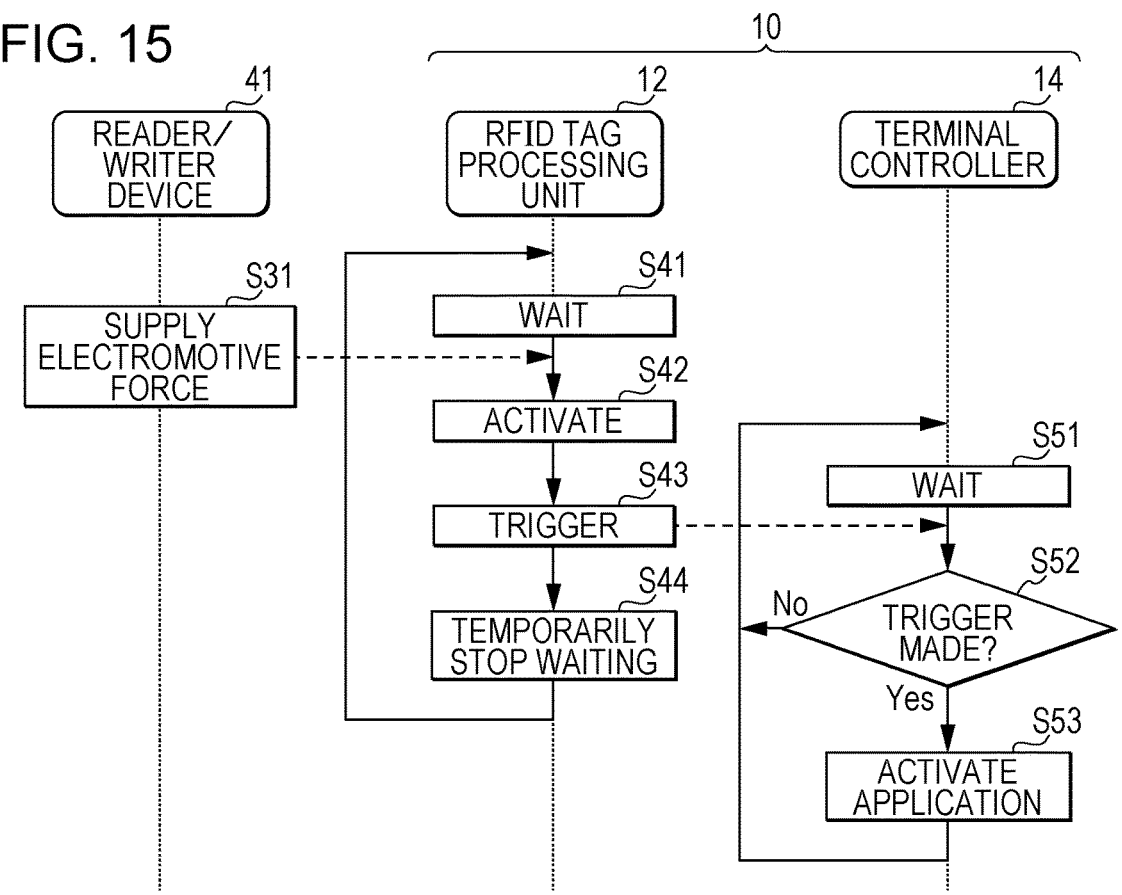
FIG. 15 is a flowchart illustrating an overview of an example process flow of electronic communication between a reader/writer device and a mobile terminal in another embodiment of the present invention.

FIG. 15 is a flowchart illustrating an overview of another example process flow of electronic communication between the reader/writer device 41 and the mobile terminal 10 in another embodiment of the present invention. The reader/writer device 41 in this example uses the FeliCa® program, and the mobile terminal 10 has an RFID tag function. In this embodiment, unlike the prior embodiment described above, the reader/writer device 41, which is included in an automatic ticket checking machine, a cash register, or the like, first emits a carrier wave and supplies power to an antenna included in the mobile terminal 10 having an RFID tag function (S31). Note that a configuration for emitting both carrier wave and polling command by the FeliCa® program of the conventional art, which is similar to that in the prior embodiment, can also be used in a similar way, since the reader/writer device 41 can supply power by carrier wave.

On the other hand, the RFID tag (the RFID tag processing unit 12) included in the mobile terminal 10 is in a power-off state and is in a waiting state (S41) but becomes active by getting an electromotive force from a carrier wave received by the antenna included in the mobile terminal 10 (S42) and transmits a trigger to the terminal controller 14 (S43). The subsequent processing in the RFID tag processing unit 12 (step S44) and processing in the terminal controller 14 (steps S51 to S53) are respectively similar to those in the process flow illustrated in FIG. 4 (step S14 and steps S21 to S23) in the prior embodiment described above and are not redundantly described herein.

The method for activating the application 15, the method for acquiring personal information and the like at the time of activation, the method for terminating the application 15, and the like are similar to those in the prior embodiment. In this embodiment, however, a user registration screen (not illustrated) for registering personal information and the like is provided for transportation carriers, sellers, and the like, as well as for the user 40, such as for example a traveler. Personal information and the like of the transportation carriers, the sellers, and the like can also include information regarding their carrier servers 42 and/or reader/writer devices 41. These users access the application server 50 via the network 30 or the like by using their own information processing terminal (in the case of the user 40, including the mobile terminal 10) and makes their information processing terminal display a screen for inputting personal information and the like.

These users input necessary personal information and the like including a user ID through the user registration screen and then activates by, for example, pressing a button on the screen to give instructions to transmit the personal information and the like. Then, information processing terminals associate the user ID with any other personal information and the like or associates the pieces of input personal information and the like including the user ID with one another and transmits the information to the application server 50. The application server 50 records the received information in the user master 58 or the store/carrier master 59.

The user registration screen may be displayed by the carrier servers 42 in systems individually run by transportation carriers, sellers, and the like. In this example, the users such as for example transportation carriers and sellers are able to access the carrier server 42 via their own information processing terminal and to acquire a user registration screen via a web server program or the like on the carrier server 42. As to personal information of a traveler (the user 40), as in the prior embodiment described above, the application 15 or the like of the mobile terminal 10 may display a user registration screen.

In this embodiment, as described above, the mobile terminal 10 receives the carrier wave from the reader/writer device 41 but does not require the polling command or the like, unlike the prior embodiment described above; that is, the mobile terminal 10 may have a configuration not including an IC chip or the RFID tag processing unit 12 to implement an RFID tag function but just including an ability to transmit the trigger to the terminal controller 14 in response to the carrier wave from the reader/writer device 41. For example, the mobile terminal 10 may have a configuration comprising a resister, an amplifier, a rectifier and/or the like and/or a timer device for adjusting the electromotive force obtained from the carrier wave and delivering a predetermined voltage and current to the terminal controller 14 for a certain period to trigger the terminal controller 14. Alternatively, the terminal controller 14 may have a configuration to check at predetermined intervals a predetermined current and voltage obtained from the carrier wave.

Figure 16:
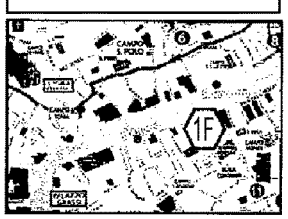
FIG. 16 is a diagram illustrating an overview of an example screen for registering a reader/writer device as a checkpoint in another embodiment of the present invention.

Next, with reference to FIG. 16 an example of a process for screen content (checkpoint registration) is described. FIG. 16 is a diagram illustrating an overview of an example screen for registering the reader/writer devices 41 included in the transportation carriers, sellers, and the like as checkpoints. Here, a user such as for example the carriers can register, as checkpoints, installation locations for automatic ticket checking machines or automatic gates, cash registers in stores, coin-operated lockers, vending machines, and the like, including reader/writer devices 41 owned by the respective carriers and the like. Values may be automatically set and displayed at the "date and time", "checkpoint ID", and "latitude, longitude" items by the application server 50 or the carrier server 42. The screen illustrated in FIG. 16 is displayed by the application server 50, for example. The screen illustrated in FIG. 16 may be displayed by the carrier servers 42 respectively owned by the carriers and the like. A user such as for example the carriers can access the application server 50 or the carrier server 42 via their own information processing terminal and acquire this screen via a web server program or the like on such a server.

Upon access from an external device including the information processing terminal (which may be either portable or fixed) operated by a user such as for example the carriers, the application server 50 may request a user ID and a password or a mobile terminal ID and permit the access when a match is found between the user ID and password or the mobile terminal ID and a user ID and password or a mobile terminal ID held in the store/carrier master 59 or the like. The carrier servers 42 respectively included in the carriers and the like shall have a typical authentication function.

When a user such as for example the carriers inputs/selects information on the position, type, and the like of a checkpoint and then activates by, for example, pressing a "set" button on the screen illustrated in FIG. 16, the information processing terminal associates the input, selected, and automatically displayed information with the user ID of carriers or the like or associates the pieces of input, selected, and automatically displayed information including the user ID with one another and transmits the information to the application server 50. The application server 50 records the received information in the checkpoint master 57. Either the information processing terminal or the application server 50 may also record the received information in the carrier server 42 included in the carriers.

On the screen illustrated in FIG. 16, for instance, the "checkpoint ID" item corresponds to ID information of a device or apparatus including the reader/writer device 41, such as for example in an automatic ticket checking machine or a cash register included in a system run by carrier businesses. Alternatively, if a different value is used, then the application server 50 or the carrier server 42 in the carriers, which performs registration upon receipt of setting information on the checkpoint, records the checkpoint ID in association with ID information of the corresponding device or apparatus such as for example an automatic ticket checking machine or a cash register. This enables the application server 50 and the carrier server 42 to understand correspondence relationships between respective checkpoints and the reader/writer devices 41.

Figure 17:
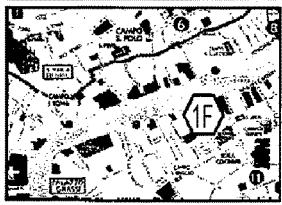
FIG. 17 is a diagram illustrating an overview of an example checkpoint detection screen according to another embodiment of the present invention.

Next, with reference to FIG. 17 an example of a process for screen content (checkpoint detection) is described. FIG. 17 is a diagram illustrating an overview of an example checkpoint detection screen when the user 40 causes the mobile terminal 10 to communicate with a reader/writer device 41 at a checkpoint. Here, the example screen is displayed on the mobile terminal 10 when a user 40 such as for example a traveler gets the mobile terminal 10 having an RFID tag function close to the reader/writer device 41 at checkpoints (for example, automatic ticket checking machines, cash registers in stores, coin-operated lockers, vending machines, automatic gates in business premises, etc.) provided with a variety of reader/writer devices 41 along a travel route to establish electronic communication there between. The application 15 of the mobile terminal 10 may generate directly and display this screen or may access the application server 50 via the network 30 and display a web page of the screen generated by the application server 50.

At the "detection date and time" item on the screen illustrated in the example in FIG. 17, information on the date and time when the mobile terminal 10 of the traveler (the user 40) has electronic communication with the reader/writer device 41 at the checkpoint is automatically set and displayed by the application 15 or the application server 50. Information on the date and time when the application 15 is activated (caused to operate) by a trigger may be automatically set and displayed. In the following fields, the user 40 is prompted to select information such as for example a position for identifying the checkpoint and related information by for example pull-down lists or the like. The user 40 may select a mark shown on a map to identify the checkpoint (the items in the pull-down lists and information on marks on the map shall be associated with each other, and the user 40 shall be able to take either items or a mark to identify a checkpoint). The contents displayed in the pull-down lists are information that has been registered by the user such as for example the carriers in advance via the screen illustrated in FIG. 16 and that has been recorded in the checkpoint master 57 in the application server 50.

If it is possible to identify the most nearby checkpoint at the moment on the basis of information on the current position (the latitude and longitude) of the user 40 which is obtained from the GPS processing unit 11 of the mobile terminal 10, then the application server 50 or the application 15 of the mobile terminal 10 shows information related to the checkpoint in the pull-down lists on the screen illustrated in FIG. 17. Alternatively, it is also possible for the mobile terminal 10 (the application 15) or the checkpoint management unit 51 of the application server 50 to omit the identification of a checkpoint on the screen and to automatically identify a checkpoint. Alternatively, if it is not possible to identify a checkpoint but is possible to extract a number of checkpoints within a predetermined distance (for example, a radius of 100 meters or 109 yards) from the checkpoint master 57, either one may display information on the extracted checkpoints in the pull-down lists.

When the traveler (the user 40) selects information suitable as an intended checkpoint and then activates by, for example, pressing a "transmit" button on the screen illustrated in FIG. 17, the mobile terminal 10 (the application 15) associates the input, selected, and automatically displayed information with the user ID of the user 40 or the ID of the mobile terminal 10 or associates the pieces of information above including the user ID or the ID of the mobile terminal 10 with one another and transmits the information to the application server 50. The application server 50 identifies, based on the received information such as for example the checkpoint ID and the contents of the checkpoint master 57, the store/carrier master 59, and the like, the corresponding checkpoint by using the checkpoint management unit 51, and also identifies the carrier, business, that runs the reader/writer device 41 corresponding to the checkpoint, the type of the checkpoint, and the like.

Then, the application server 50 requests the carrier server 42 included in the identified carrier or the like to operate the reader/writer device 41 included in the checkpoint by using the reader/writer device control unit 52. For example, when the reader/writer device 41 included in the checkpoint is an entry gate of an automatic ticket checking machine, an automatic gate, or the like, the reader/writer device control unit 52 instructs the carrier server 42, which is included in a transportation operating carrier, an enterprise, or the like, to open or close the gate or record information related to an entry (information on the date and time, the location, and the user 40, etc.). Upon receipt of the instructions, the carrier server 42 remotely causes the reader/writer device 41 (such as for example an automatic ticket checking machine or an automatic gate) included in the identified checkpoint to perform operations such as for example opening or closing the gate or recording the entry; likewise, where the reader/writer device 41 is a coin-operated locker (when locked), the carrier server 42 causes the reader/writer device 41 to record information related to locking when making the reader/writer device 41 lock the coin-operated locker.

Furthermore, when the reader/writer device 41 included in the identified checkpoint is a cash register or the like, the carrier server 42 owned by a business or the like acquires from the reader/writer device 41 included in the checkpoint the information which the reader/writer device 41 displays/outputs to the traveler (user 40) by a monitor or the like at the timing of the "detection date and time" given on the screen illustrated in FIG. 16, and transmits the information to the mobile terminal 10 possessed by the user 40 via the application server 50; that is, when the reader/writer device 41 included in the checkpoint is a cash register or the like, the "detection date and time" information given on the screen illustrated in FIG. 16 indicates the timing at which the user 40 has purchased goods and/or services. Hence, information displayed/output to the user 40 by the reader/writer device 41 at that timing can include various kinds of information related to goods and/or services that the user 40 is to purchase (for example, a service/goods name, a volume, a quantity per pack, a size, a grade, a quantity of purchase, a unit price, a total amount, etc.). In this embodiment, this information is transmitted to the mobile terminal 10 possessed by the user 40.

At this time, the mobile terminal 10 can display, for example, the received information related to goods and/or services and also display a screen that requests the user 40 to approve, consent, confirm, and the like. When the user 40 expresses approval, consent, and the like by, for example, pressing a button displayed on the screen, the application 15 (and the charging processing unit 53 of the application server 50) performs a billing and settling process.

Billing and settling use, for example, credit/debit card information registered by the user 40 in advance at the time of user registration or the like. The mobile terminal 10 or the charging processing unit 53 of the application server 50 transmits billing and settling information (for example, information on what goods/service and in which store the user 40 is to purchase, the date and time of purchase, the amount charged, etc.) and the credit/debit card information of the user 40 to a server in a financial institution such as for example a credit/debit card company. The server in the financial institution performs a predetermined payment process, settlement process, and then transmits payment information, settlement information, to the charging processing unit 53 of the application server 50. Thereafter, the charging processing unit 53 of the application server 50 transmits the payment information to the mobile terminal 10 and the carrier server 42.

When the carrier server 42, which is installed in a seller, has its own billing mechanism, this mechanism may be used. For example, since a seller typically has an alliance with a credit card company or the like and has a billing mechanism similar to that described above, this mechanism can be used. In this case, for example, the application 15 of the mobile terminal 10 transmits credit/debit card information of the user 40 from the application server 50 to the carrier server 42 included in the seller, and performs a billing and settling by using its own mechanism.

When billing and settling are completed, the carrier server 42 displays at least part of information on the completed billing and settling on a monitor of the reader/writer device 41 (such as for example a cash register, a coin-operated locker, or a vending machine). The carrier server 42 or the charging processing unit 53 may record the billing and settling information in the charging information TB 56 in the application server 50.

When the reader/writer device 41 (checkpoint) is for example an exit gate of an automatic ticket checking machine, a coin-operated locker (when unlocked), a vending machine, or the like, in addition to making billing and settling, the reader/writer device control unit 52 instructs the carrier server 42 to open or close the gate or record information related to an exit or to perform operations related to unlocking or dispensing goods, as described above. As described above, the billing and settling process may be performed by the application 15 of the mobile terminal 10 (and the charging processing unit 53 of the application server 50) or by using a charging mechanism of the carrier server 42, which is included in a transportation carrier or the like.

Thus, mobile terminals, mobile terminal programs, checkpoint management systems, and checkpoint management methods in accordance with the principals of the present invention have various advantageous effects. As described above, according to the mobile terminal 10, the application server 20 (the application server 50), and the checkpoint management system 1 that uses the mobile terminal 10 and application server 20 (the application server 50) in the embodiments of the present invention, the mobile terminal 10 having an RFID tag function activates a predetermined application 15 to perform processing upon receipt of a command such as for example a polling command from the reader/writer device 41 or a carrier wave as a trigger. This enables electronic communication between the mobile terminal 10 and a number of kinds of reader/writer devices 41. Hence, the mobile terminal 10 (user 40) can use or set the reader/writer devices 41 located on a travel route along which the user 40, such as for example a traveler, travels as checkpoints regardless of the difference in control programs among the reader/writer devices 41 at the respective checkpoints and/or regardless of whether or not to use a program for a higher-level system (for example, a program for a billing system cooperatively used by a railway carrier and a seller that have an alliance, etc.), and the like.

The mobile terminal 10, for example, can use the reader/writer devices 41 such as for example those in railway carriers, airline companies and bus carriers, vending machines of companies, coin-operated lockers of companies, cash registers in convenience stores, and entry and exit gates for enterprises, regardless of whether or not they cooperatively use a system. This enables unified management of passage information not only for, for example, travels between checkpoints of transportation carriers and stores of sellers who have an alliance with the carriers but also for travels along the checkpoints beyond the scope of the alliance, and enables provision of predicted passage times at the checkpoints, information on special sales along a travel route, and the like. By using this mechanism, for example, a traveler (the user 40) can predict the time for a transfer between the transportation carriers having different alliances (or no alliance) or predict the total travel time.

In particular, as to an international journey using airlines having frequent delays, it is difficult to predict the travel time because of large variations in waiting time at an airport, the transfer time between flights, the time to transfer from an aircraft to ground transportation, and the like. In addition, in the example of travel using a number of transportation operating carriers or a travel across countries, it is difficult to manage passing through checkpoints with a single RFID tag. Thus, such problems are expected to be overcome by the prevalence of the mechanism according to the present invention.

Additionally, a traveler (the user 40) makes various kinds of payments during a travel. For example, the traveler eats and drinks, buys souvenirs, pays fares, stays somewhere overnight, or enjoys leisure activities during the travel. These payments are not made for a single carrier, or business, or at a single location. They are made for various carriers at various places along the travel route. Where carriers or locations require different billing and settling system, the user 40 needs to have RFID tags which corresponds to different billing and settling systems; however, according to the mechanism of the present invention, the user 40 can make all payments with a single RFID tag.

At present, major railway carriers in for example Japan install automatic ticket checking machines at every station, and enable passengers to use the mobile terminals of the passengers having an RFIF tag function. Every major railway company takes passenger convenience into account and realizes interchangeable use in such a manner that its RFID tag function is also available in the automatic ticket checking machines installed by other companies; however, railway carriers that do not participate in an interchangeable use program cannot allow their passengers to use the mobile terminals of the passengers having an RFID tag function for the automatic ticket checking machines installed at the railway stations of other companies. For example, if a local privately-owned railway operating company (local railway company) installs automatic ticket checking machines at stations to save on personnel costs, passengers of the local railway company cannot pass the automatic ticket checking machines installed at the stations of major railway companies unless the local railway company takes part in the program in which the major railway companies participate for interchangeable use of the mobile terminal having an RFID tag function. In this example, the passengers are required to take measures such as for example purchasing tickets of the major railway companies, which may not be convenient.

Even a railway carrier that participates in the interchangeable use program cannot allow its passengers to use their mobile terminals having its RFID tag function when they pass the automatic ticket checking gates at the stations of the railway carriers that do not participate in the interchangeable use program. For example, a passenger who possesses a mobile terminal having an RFID tag function of a major railway company that participates in the interchangeable use program is to use a train operated by a foreign railway company during a journey abroad. In this example, if no interchangeable use program exists between the major railway company and the foreign railway company, the passenger needs to take measures such as for example purchasing a ticket at a station during the journey. It is not so often an easy task to correctly purchase a ticket and board a train in an unfamiliar foreign country with a different lifestyle, culture, language, and the like.

In contrast, the mechanism of the present invention, for example, enables even financially-distressed local railway carriers, foreign transportation carriers, and small retail stores or restaurants run by sole proprietors to accept the use of the mobile terminal having an RFID tag function if the entity installs a low-cost, general-purpose reader/writer device. The user 40, such as for example a traveler, who possesses an mobile terminal having an RFID tag function can use various passive RFID tag reader/writer devices installed at trip or travel destinations without constraints caused by the difference in regions, countries, operating carriers of transportation, stores, etc., and the like.

Electronic money technology has already been established but may not be prevalent in many carriers, businesses, because apparatuses and devices are expensive and have a limited use. Therefore, it is difficult in reality to travel domestically or internationally without having cash; however, the mechanism of the present invention can spread low-cost, general-purpose reader/writer devices prevalently across almost all carriers, and it can be expected to realize full-fledged cashless trips (travels).

While the invention made by the inventor is described in a specific manner with reference to embodiments and examples, the present invention is not limited to the embodiments described above, and it is to be understood that a variety of modifications can be made without deviating from the spirit and scope of the substance of the invention. For example, the foregoing embodiments have been described in detail for easy understanding of the present invention and are not necessarily limited to those having the entire configuration described above. In addition, part of the configuration of a certain embodiment can be replaced with the configuration of any other embodiment, and the configuration of a certain embodiment can be added to the configuration of any other embodiment. Furthermore, part of the configuration of each embodiment can be subjected to addition, deletion and substitution of any other configuration.

For example, although the embodiments described above explain the present invention by using the example of a traveler (the user 40) as a travel object, the travel object may be any other thing such as for example a vehicle or a walking robot. In this case, for example, an information processing terminal operated by a user in any other distant place receives and displays an input/selection screen for a checkpoint, a screen for displaying information regarding goods/services when billing and settling are processed, and the like, which should originally be displayed on a monitor of the mobile terminal 10, and the user performs an operation, input, and so forth on the information processing terminal to perform processing. In this case, for example, when a checkpoint is an automatic gate and if the automatic gate through which the user is going to pass can be identified from position information or the like obtained by the GPS processing unit 11 of the mobile terminal 10, then the user does not need to perform a remote operation.

While the invention has been described with specific embodiments, other alternatives, modifications, and variations will be apparent to those skilled in the art. Accordingly, it will be intended to include all such alternatives, modifications and variations set forth within the spirit and scope of the appended claims.

The invention claimed is:

1. A mobile terminal that performs contactless electronic communication with a reader/writer device for a passive RFID tag, the mobile terminal comprising:
   an application processing unit configured to cooperate with an application server through a communication network;
   a position information acquisition unit configured to acquire current position information of the mobile terminal;
   an RFID tag processing unit configured to receive a signal related to a carrier wave or a command emitted from the reader/writer device and to output in response to said signal a trigger; and
   a terminal controller configured to cause the application processing unit to operate in response to the trigger,
   wherein the application processing unit is configured to acquire, from the mobile terminal, identification information of a user of the mobile terminal or identification information of the mobile terminal and chronologic information of a date and time when the application processing unit operates or a date and time when the reader/writer device and the RFID tag processing unit perform communication, and
   further wherein the application processing unit is configured to transmit the identification information and the chronologic information directly through said communication network to the application server together with the current position information acquired by the position information acquisition unit or information of a checkpoint related to the reader/writer device identified on the basis of the current position information.

2. The mobile terminal according to claim 1, wherein the application processing unit is further configured to identify a checkpoint related to the reader/writer device by causing the user to select the checkpoint among the group consisting of one or more checkpoints extracted by the application server from a plurality of the checkpoints registered in advance in the application server on the basis of the current position information.

3. A mobile terminal that performs contactless electronic communication with a reader/writer device for a passive RFID tag, the mobile terminal comprising:
   an application processing unit configured to cooperate with an application server through a communication network;
   a position information acquisition unit configured to acquire current position information of the mobile terminal; and
   a terminal controller configured to receive a signal related to a carrier wave or a command emitted from the reader/writer device and further configured to cause the application processing unit to operate,
   wherein the application processing unit is configured to acquire, from the mobile terminal, identification information of a user of the mobile terminal or identification information of the mobile terminal and chronologic information of a date and time when the application processing unit operates or a date and time when the reader/writer device and the terminal controller perform electronic communication, and
   further wherein the application processing unit is configured to transmit the identification information and the chronologic information directly through said communication network to the application server together with the current position information acquired by the position information acquisition unit or information of a checkpoint related to the reader/writer device identified on the basis of the current position information.

4. The mobile terminal according to claim 3, wherein the application processing unit is further configured to identify a checkpoint related to the reader/writer device by causing the user to select the checkpoint among the group consisting of one or more checkpoints extracted by the application server from a plurality of the checkpoints registered in advance in the application server on the basis of the current position information.

5. A checkpoint management system comprising:
   a reader/writer device for a passive RFID tag;
   an application server;
   a mobile terminal configured to perform contactless electronic communication with the reader/writer device for a passive RFID tag, the mobile terminal comprising:
   an application processing unit configured to cooperate with said application server through a communication network;
   a position information acquisition unit configured to acquire current position information of the mobile terminal; and
   a terminal controller configured to receive a signal related to a carrier wave or a command emitted from the reader/writer device and to cause the application processing unit to operate in response to said signal;
   wherein the application processing unit is configured to acquire, from a mobile terminal, identification information of a user of the mobile terminal or identification information of the mobile terminal and chronologic information of a date and time when the application processing unit operates or a date and time when the reader/writer device and the terminal controller perform electronic communication;
   wherein the application processing unit is configured to transmit the identification information and the chronologic information directly over said communication network to the application server together with the current position information acquired by the position information acquisition unit or information of a checkpoint related to the reader/writer device identified on the basis of the current position information,
   and wherein the application server is configured to record information transmitted from the mobile terminal as history information on the checkpoint from, through, or at which the user departs, passes or arrives.

6. The checkpoint management system according to claim 5, wherein the application server is further configured to hold master information related to a plurality of the checkpoints; and the application server includes a checkpoint management unit that extracts, from the master information, information of the checkpoint(s) located within a predetermined distance on the basis of designated position information;

and wherein the application processing unit of the mobile terminal is configured to identify the checkpoint related to the reader/writer device by causing the user to select the checkpoint among the one or more checkpoints extracted by the application server on the basis of the current position information.

7. The checkpoint management system according to claim 5, wherein the application server further includes a prediction processing unit that, in response to receipt of information of the one or more checkpoints from, through, or at which the user is scheduled to depart, pass, or arrive and information of transportation to be used by the user, performs statistical processing of information recorded in the history information and determines a point estimate or an estimation interval related to a departure, passage or arrival time at each of the checkpoints and that outputs the point estimate or the estimation interval as travel schedule information.

8. The checkpoint management system according to claim 7, wherein the application server is further configured to hold master information which is related to a seller and which includes information of an output condition of an advertisement related to an event held by the seller; and wherein said application server further includes a recommendation information management unit that extracts and outputs information of the event scheduled to be held within a predetermined distance from each checkpoint from, through, or at which the user is scheduled to depart, pass, or arrive, on the basis of information of the point estimate or the estimation interval which is related to the departure, passage or arrival time at each of the checkpoints and which is included in the travel schedule information, and on the basis of the output condition of the advertisement registered in the master information on the seller.

9. The checkpoint management system according to claim 5, wherein the application server further includes a reader/writer device control unit that outputs an instruction for operating the reader/writer device installed at the checkpoint from, through, or at which the user has departed, passed, or arrived or is scheduled to depart, pass, or arrive.

10. The checkpoint management system according to claim 5, wherein the application server further includes a charging processing unit that performs a billing process related to a use of a service associated with the checkpoint from, through, or at which the user departs, passes or arrives.

11. A checkpoint management system comprising:
a reader/writer device for a passive RFID tag;
a mobile terminal configured to perform contactless electronic communication with the reader/writer device for a passive RFID tag, the mobile terminal comprising:
an application processing unit configured to cooperate with an application server through a communication network;
a position information acquisition unit configured to acquire current position information of the mobile terminal;
an RFID tag processing unit configured to receive a signal related to a carrier wave or a command emitted from the reader/writer device and to output in response to said signal a trigger; and
a terminal controller configured to cause the application processing unit to operate in response to the trigger;
wherein the application processing unit is configured to acquire, from the mobile terminal, identification information of a user of the mobile terminal or identification information of the mobile terminal and chronologic information of a date and time when the application processing unit operates or a date and time when the reader/writer device and the terminal controller perform electronic communication;
wherein the application processing unit is configured to transmit the identification information and the chronologic information directly through said communication network, to the application server together with the current position information acquired by the position information acquisition unit or information of a checkpoint related to the reader/writer device identified on the basis of the current position information;
and wherein the application server is configured to record the information transmitted from the mobile terminal as history information on the checkpoint from, through, or at which the user departs, passes or arrives.

12. The checkpoint management system according to claim 11, wherein the application server is further configured to hold master information related to a plurality of the checkpoints; wherein said application server further includes a checkpoint management unit that extracts, from the master information, information of the checkpoint(s) located within a predetermined distance on the basis of designated position information; and
wherein the application processing unit of the mobile terminal is configured to identify the checkpoint related to the reader/writer device by causing the user to select the checkpoint among the one or more checkpoints extracted by the application server on the basis of the current position information.

13. The checkpoint management system according to claim 11, wherein the application server further includes a prediction processing unit that, in response to receipt of information of the one or more checkpoints from, through, or at which the user is scheduled to depart, pass, or arrive and information of transportation to be used by the user, performs statistical processing of information recorded in the history information and determines a point estimate or an estimation interval related to a departure, passage or arrival time at each of the checkpoints and that outputs the point estimate or the estimation interval as travel schedule information.

14. The checkpoint management system according to claim 13, wherein the application server is further configured to hold master information which is related to a seller and which includes information of an output condition of an advertisement related to an event held by the seller; and wherein the application server further includes a recommendation information management unit that extracts and outputs information of the event scheduled to be held within a predetermined distance from each checkpoint from, through, or at which the user is scheduled to depart, pass, or arrive, on the basis of information of the point estimate or the estimation interval which is related to the departure, passage or arrival time at each of the checkpoints and which is included in the travel schedule information, and on the basis of the output condition of the advertisement registered in the master information on the seller.

15. The checkpoint management system according to claim 11, wherein the application server further includes a reader/writer device control unit that outputs an instruction for operating the reader/writer device installed at the checkpoint from, through, or at which the user has departed, passed, or arrived or is scheduled to depart, pass, or arrive.

16. The checkpoint management system according to claim 11, wherein the application server further includes a charging processing unit that performs a billing process related to a use of a service associated with the checkpoint from, through, or at which the user departs, passes or arrives.

17. A checkpoint management method for an information processing system that includes a reader/writer device for a passive RFID tag, a mobile terminal that performs contactless electronic communication with the reader/writer device, and an application server capable of communicating with the mobile terminal, the checkpoint management method comprising:
   a position information acquisition step of acquiring, by the mobile terminal, current position information;
   a step of outputting, by the mobile terminal, a trigger upon receiving a signal related to a carrier wave or a command emitted from the reader/writer device;
   a step of executing, by the mobile terminal, an application process of cooperating with the application server through a communication network, in accordance with the trigger,
   the application process includes acquiring, from the mobile terminal, identification information of a user of the mobile terminal or identification information of the mobile terminal and chronologic information of a date and time when the application process is executed or a date and time when the reader/writer device and the mobile terminal perform electronic communication, and transmitting the identification information and the chronologic information directly through said communication network to the application server together with the current position information acquired in the position information acquisition step or information of a checkpoint related to the reader/writer device identified on the basis of the current position information; and
   a step of recording, by the application server, information transmitted from the mobile terminal as history information on the checkpoint from, through, or at which the user departs, passes or arrives.

18. The checkpoint management method according to claim 17, further comprising:
   a step of holding, by the application server, master information related to a plurality of the checkpoints; and
   a step of extracting, by the application server, from the master information, information of the checkpoint(s) located within a predetermined distance on the basis of designated position information,
   wherein the application process of the mobile terminal further includes identifying the checkpoint related to the reader/writer device by causing the user to select the checkpoint among the one or more checkpoints extracted by the application server on the basis of the current position information.

19. The checkpoint management method according to claim 17, further comprising a step of performing, by the application server, in response to receipt of information of the one or more checkpoints from, through, or at which the user is scheduled to depart, pass, or arrive and information of transportation to be used by the user, statistical processing of information recorded in the history information, determining, by the application server, a point estimate or an estimation interval related to a departure, passage or arrival time at each of the checkpoints, and outputting, by the application server, the point estimate or the estimation interval as travel schedule information.

20. The checkpoint management method according to claim 19, further comprising:
   a step of holding, by the application server, master information which is related to a seller and which includes information of an output condition of an advertisement related to an event held by the seller; and
   a step of extracting and outputting, by the application server, information of the event scheduled to be held within a predetermined distance from each checkpoint from, through, or at which the user is scheduled to depart, pass, or arrive, on the basis of information of the point estimate or the estimation interval which is related to the departure, passage or arrival time at each of the checkpoints and which is included in the travel schedule information, and on the basis of the output condition of the advertisement registered in the master information on the seller.

21. The checkpoint management method according to claim 17, further comprising a step of outputting, by the application server, an instruction for operating the reader/writer device installed at the checkpoint from, through, or at which the user has departed, passed, or arrived or is scheduled to depart, pass, or arrive.

22. The checkpoint management method according to claim 17, further comprising a step of performing, by the application server, a billing process related to a use of a service associated with the checkpoint from, through, or at which the user departs, passes or arrives.

23. A checkpoint management method for an information processing system that includes a reader/writer device for a passive RFID tag, a mobile terminal that performs contactless electronic communication with the reader/writer device, and an application server capable of communicating with the mobile terminal, the checkpoint management method comprising:
   a position information acquisition step of acquiring, by the mobile terminal, current position information;
   a step of executing, by the mobile terminal, an application process of cooperating with the application server through a communication network upon receiving a signal related to a carrier wave or a command emitted from the reader/writer device,
   the application process includes acquiring, from the mobile terminal, identification information of a user of the mobile terminal or identification information of the mobile terminal and chronologic information of a date and time when the application process is executed or a date and time when the reader/writer device and the mobile terminal perform electronic communication, and transmitting the identification information and the chronologic information directly through the said communication network to the application server together with the current position information acquired in the position information acquisition step or information of a checkpoint related to the reader/writer device identified on the basis of the current position information; and
   a step of recording, by the application server, information transmitted from the mobile terminal as history information on the checkpoint from, through, or at which the user departs, passes, or arrives.

24. The checkpoint management method according to claim 23, further comprising:
   a step of holding, by the application server, master information related to a plurality of the checkpoints; and
   a step of extracting, by the application server, from the master information, information of the checkpoint(s) located within a predetermined distance on the basis of designated position information,
   wherein the application process of the mobile terminal further includes identifying the checkpoint related to the reader/writer device by causing the user to select the checkpoint among the one or more checkpoints extracted by the application server on the basis of the current position information.

25. The checkpoint management method according to claim 23, further comprising a step of performing, by the application server, in response to receipt of information of the one or more checkpoints from, through, or at which the user is scheduled to depart, pass, or arrive and information of transportation to be used by the user, statistical processing of information recorded in the history information, determining, by the application server, a point estimate or an estimation interval related to a departure, passage or arrival time at each of the checkpoints, and outputting, by the application server, the point estimate or the estimation interval as travel schedule information.

26. The checkpoint management method according to claim 25, further comprising:
a step of holding, by the application server, master information which is related to a seller and which includes information of an output condition of an advertisement related to an event held by the seller; and
a step of extracting and outputting, by the application server, information of the event scheduled to be held within a predetermined distance from each checkpoint from, through, or at which the user is scheduled to depart, pass, or arrive, on the basis of information of the point estimate or the estimation interval which is related to the departure, passage or arrival time at each of the checkpoints and which is included in the travel schedule information, and on the basis of the output condition of the advertisement registered in the master information on the seller.

27. The checkpoint management method according to claim 23, further comprising a step of outputting, by the application server, an instruction for operating the reader/writer device installed at the checkpoint from, through, or at which the user has departed, passed, or arrived or is scheduled to depart, pass, or arrive.

28. The checkpoint management method according to claim 23, further comprising a step of performing, by the application server, a billing process related to a use of a service associated with the checkpoint from, through, or at which the user departs, passes or arrives.

29. A non-transitory medium in which a mobile terminal program is recorded for causing a mobile terminal capable of acquiring current position information of the mobile terminal to execute a process so as to perform contactless electronic communication with a reader/writer device for a passive RFID tag, the process comprising:
causing the mobile terminal to execute an application process of cooperating with an application server through a communication network in response to, as a trigger, the mobile terminal receiving a signal related to a carrier wave or a command emitted from the reader/writer device,
wherein the application process includes acquiring, from the mobile terminal, identification information of a user of the mobile terminal or identification information of the mobile terminal and chronologic information of a date and time when the application process is executed or a date and time when the reader/writer device and the mobile terminal perform electronic communication, and transmitting the identification information and the chronologic information directly through said communication network to the application server together with the current position information acquired by the mobile terminal or information of a checkpoint related to the reader/writer device identified on the basis of the current position information.

30. The non-transitory medium according to claim 29, wherein the application process further includes identifying the checkpoint related to the reader/writer device by causing the user to select the checkpoint among the one or more checkpoints extracted by the application server from a plurality of the checkpoints registered in advance in the application server on the basis of the current position information.

* * * * *